（12）United States Patent
Kim et al.

(10) Patent No.: US 9,124,122 B2
(45) Date of Patent: Sep. 1, 2015

(54) WIRELESS POWER TRANSMISSION AND CHARGING SYSTEM, AND IMPEDANCE CONTROL METHOD THEREOF

(75) Inventors: Nam Yun Kim, Seoul (KR); Sang Wook Kwon, Seongnam-si (KR); Yun Kwon Park, Dongducheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 387 days.

(21) Appl. No.: 13/471,907

(22) Filed: May 15, 2012

(65) Prior Publication Data

US 2012/0293118 A1    Nov. 22, 2012

(30) Foreign Application Priority Data

May 18, 2011    (KR) .................. 10-2011-0046654

(51) Int. Cl.
*H02J 7/00* (2006.01)
*H02J 7/02* (2006.01)
*H02J 5/00* (2006.01)
*B60L 11/18* (2006.01)

(52) U.S. Cl.
CPC .............. *H02J 7/025* (2013.01); *B60L 11/182* (2013.01); *B60L 11/1833* (2013.01); *H02J 5/005* (2013.01); *B60L 2210/10* (2013.01); *B60L 2210/30* (2013.01); *B60L 2210/40* (2013.01); *Y02T 10/7005* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
None
See application file for complete search history.

(56) References Cited

U.S. PATENT DOCUMENTS

| | | | | |
|---|---|---|---|---|
| 8,334,620 | B2* | 12/2012 | Park et al. ..................... | 307/104 |
| 8,643,326 | B2* | 2/2014 | Campanella et al. ......... | 320/108 |
| 8,723,642 | B2* | 5/2014 | Park et al. ..................... | 340/5.8 |
| 2004/0151147 | A1* | 8/2004 | Huckins ........................ | 370/338 |
| 2008/0054638 | A1* | 3/2008 | Greene et al. ................. | 290/1 R |
| 2008/0278635 | A1* | 11/2008 | Hardacker et al. ............ | 348/734 |
| 2009/0015075 | A1* | 1/2009 | Cook et al. .................... | 307/149 |
| 2009/0284220 | A1* | 11/2009 | Toncich et al. ............... | 320/108 |
| 2009/0289595 | A1 | 11/2009 | Chen et al. | |
| 2010/0171368 | A1* | 7/2010 | Schatz et al. ................. | 307/104 |
| 2010/0244576 | A1 | 9/2010 | Hillan et al. | |
| 2010/0259109 | A1* | 10/2010 | Sato .............................. | 307/104 |
| 2010/0277121 | A1* | 11/2010 | Hall et al. ..................... | 320/108 |
| 2011/0062916 | A1* | 3/2011 | Farahani ....................... | 320/108 |
| 2011/0156639 | A1* | 6/2011 | Ryu et al. ..................... | 320/108 |
| 2011/0231029 | A1* | 9/2011 | Ichikawa et al. ............. | 700/298 |
| 2011/0235800 | A1* | 9/2011 | Furukawa et al. ............ | 380/33 |
| 2011/0241621 | A1* | 10/2011 | Inoue ............................ | 320/113 |
| 2012/0153893 | A1* | 6/2012 | Schatz et al. ................. | 320/108 |

(Continued)

FOREIGN PATENT DOCUMENTS

| | | |
|---|---|---|
| JP | 59-221020 A | 12/1984 |
| JP | 2010-226890 A | 10/2010 |

(Continued)

*Primary Examiner* — Leigh Garbowski
(74) *Attorney, Agent, or Firm* — NSIP Law

(57) ABSTRACT

A wireless power transmission and charging system and method are provided. The wireless power may refer to energy that may be transferred from a wireless power transmitter to a wireless power receiver. The wireless power transmission and charging system may include a source device to wirelessly transmit power, and a target device to wirelessly receive power.

29 Claims, 21 Drawing Sheets

(56) References Cited

U.S. PATENT DOCUMENTS

2013/0119928 A1* 5/2013 Partovi .................... 320/108
2014/0159652 A1* 6/2014 Hall et al. ................. 320/108

FOREIGN PATENT DOCUMENTS

KR        10-0251273 B1    1/2000
KR    10-2010-0010405 A    2/2010

* cited by examiner

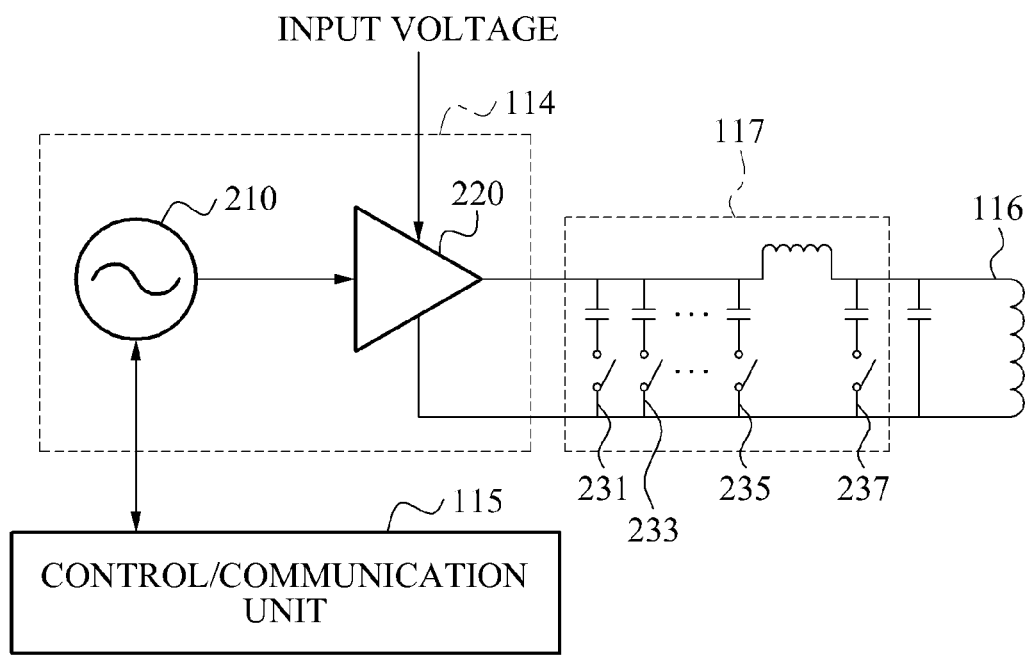

117

117

117

117

117

117

117

→ ORDER OF SWITCHES TO BE POWERED ON

ORDER OF SWITCHES TO BE POWERED ON ←

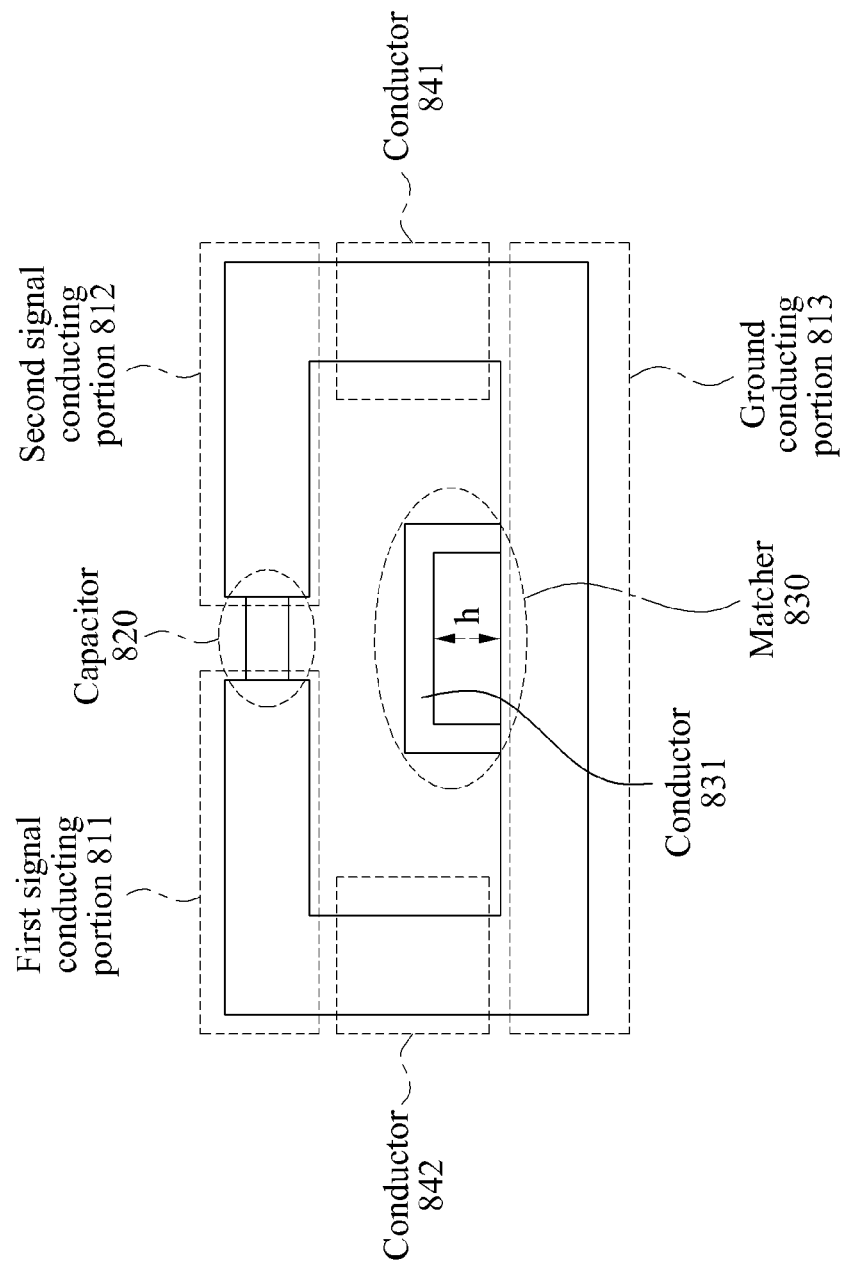

WIRELESS POWER TRANSMISSION AND CHARGING SYSTEM, AND IMPEDANCE CONTROL METHOD THEREOF

CROSS-REFERENCE TO RELATED APPLICATION(S)

This application claims the benefit under 35 U.S.C. §119 (a) of Korean Patent Application No. 10-2011-0046654, filed on May 18, 2011, in the Korean Intellectual Property Office, the entire disclosure of which is incorporated herein by reference for all purposes.

BACKGROUND

1. Field

The following description relates to a wireless power transmission and charging system, and an impedance control method thereof.

2. Description of Related Art

Wireless power transfer refers to energy that is transferred from a wireless power transmitter to a wireless power receiver, for example, using magnetic coupling. The wireless power receiver may charge a battery using the received energy. Typically, a wireless power transmission and charging system includes a source device to wirelessly transmit power and a target device to wirelessly receive the power. In this example, the source device is referred to as a wireless power transmitter and the target device is referred to as a wireless power receiver.

Typically the source device includes a source resonator, and the target device includes a target resonator. Magnetic coupling or resonance coupling may be formed between the source resonator and the target resonator thus allowing for the transfer of power.

SUMMARY

In one general aspect, there is provided an impedance control method of a wireless power transmitter configured to transmit power to a plurality of target devices, the method including generating power for charging by determining an impedance of a source resonator based on the number of the plurality of target devices, and adjusting a signal level of a direct current (DC) voltage to be supplied to a power amplifier based on the number of the plurality of target devices, transmitting the charging power to the plurality of target devices through magnetic coupling, and adjusting the impedance of the source resonator based on one or more of a reflected wave of the charging power, an amount of power received by each of the plurality of target devices, an amount of the charging power, and a transmission efficiency of the charging power.

The method may further comprise, prior to generating a charging power, transmitting a wake-up request message to the plurality of target devices, receiving response messages corresponding to the wake-up request message from the plurality of target devices, and detecting the number of the plurality of target devices based on the received response messages.

The adjusting of the impedance of the source resonator may be performed by controlling N matching switches to be powered ON and/or OFF, and the N matching switches may be connected to a plurality of capacitors and/or a plurality of inductors.

Each of the response messages may comprise one or more of a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a used frequency band of the corresponding target device, an amount of a power to be used for the corresponding target device, an intrinsic identifier of the corresponding target device, and product version information or standards information of the corresponding target device.

The generating of the charging power may comprise determining the signal level of the DC voltage to be supplied to, the power amplifier based on one or more of a product type of the corresponding target device, a manufacturer information of the corresponding target device, a product model name of the corresponding target device, a battery type of the corresponding target device, a charging scheme of the corresponding target device, an impedance value of the load of the corresponding target device, information about the characteristic of the target resonator of the corresponding target device, information about the used frequency band of the corresponding target device, and an amount of a power to be used for the corresponding target device.

The adjusting of the impedance of the source resonator may comprise calculating a voltage standing wave ratio (VSWR) based on a voltage level of the reflected wave, a level of an output voltage, and a level of an output current of a source resonator, controlling the N matching switches to be powered ON and OFF, in response to the VSWR being less than a predetermined, reference value, determining a tracking impedance having a power transmission efficiency above a predetermined threshold, and changing the impedance of the source resonator to the tracking impedance having the power transmission efficiency above the predetermined threshold.

The determining of the tracking impedance having the power transmission efficiency above a predetermined threshold may comprise performing the following operations a) through g) continuously for each of the N matching switches, a) selecting at least one of the N matching switches based on a predetermined selection scheme;

b) changing the impedance of the source resonator to a selected impedance, by controlling the at least one selected matching switch to be powered ON;

c) transmitting the charging power;

d) transmitting, to the plurality of target devices, a command to request an input voltage value and an input current value of a target device, or a command to request a DC/DC output voltage value and a DC/DC output current value of the target device;

e) receiving, from each of the plurality of target devices, an input voltage value and an input current value of a rectification unit, or the DC/DC output voltage value and the DC/DC output current value;

f) calculating an amount of a power received by each of the plurality of target devices, based on the input voltage value and the input current value, or the DC/DC output voltage value and the DC/DC output current value; and g) calculating a transmission efficiency of the charging power, based on an output voltage level and an output current level of the source resonator, and the amount of a power received by each of the plurality of target devices.

The predetermined selection scheme in the operation a) may correspond to a scheme of selecting matching switches so that the plurality of capacitors may be powered ON and OFF in a sequential order, beginning from a capacitor having a lowest capacitance value to a capacitor having a highest capacitance value, or a scheme of selecting matching switches so that the plurality of capacitors may be powered ON and OFF in a sequential order, beginning from the capacitor having the highest capacitance value to the capacitor having the lowest capacitance value.

The predetermined selection scheme in the operation a) may correspond to a scheme of sequentially selecting M matching switches from the N matching switches, performing the operations b) through g) continuously for each of the M matching switches, and subsequently performing the operations b) through g) continuously for each matching switch, excluding the M matching switches from the N matching switches, M being less than N.

The predetermined selection scheme in the operation a) may correspond to a scheme of classifying the N matching switches into M groups, selecting one of the M groups based on the number of the one or more target devices, and sequentially selecting tracking frequencies included in the selected group, M being less than N.

In another aspect, there is provided a wireless power transmitter including a power converter configured to generate power used for communication or a charging power used for charging in a plurality of target devices, by converting a direct current (DC) voltage to be supplied to a power amplifier to an alternating current (AC) voltage using a resonance frequency, a source resonator configured to transmit, to a plurality of target devices, the generated power through magnetic coupling, and an impedance adjusting unit configured to adjust an impedance of the source resonator based on one or more of a reflected wave of the charging power, an amount of power received by each of the plurality of target devices, an amount of the charging power, and a transmission efficiency of the charging power.

The impedance adjustment unit may be configured to adjust the impedance of the source resonator by controlling N matching switches to be powered ON and OFF, and the impedance adjusting unit comprises the N matching switches which are connected to a plurality of capacitors and/or a plurality of inductors.

The wireless power transmitter may further comprise a control and communication unit configured to determine the impedance of the source resonator, and a signal level of the DC voltage to be supplied to the power amplifier based on the number of the plurality of target devices, and to control the impedance adjusting unit.

The control and communication unit may be configured to determine the signal level of the DC voltage to be supplied to the power amplifier, based on one or more of a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a used frequency band of the corresponding target device, and an amount of a power to be used for the corresponding target device.

The control and communication unit may be configured to calculate a voltage standing wave ratio (VSWR) based on a voltage level of the reflected wave, a level of an output voltage, and a level of an output current of the source resonator, to control the N matching switches to be powered ON and OFF if the VSWR is less than a predetermined value, to determine a tracking impedance having a power transmission efficiency above a predetermined threshold, and to change the impedance of the source resonator to the tracking impedance having the power transmission efficiency above the predetermined threshold.

The control and communication unit may be configured to perform the following operations a) through g) continuously for each of the N matching switches in order to determine the tracking impedance having the power transmission efficiency above the predetermined threshold, a) selecting at least one of the N matching switches, based on a predetermined selection scheme;

b) changing the impedance of the source resonator to a selected impedance, by controlling the at least one selected matching switch to be powered ON;

c) transmitting the charging power;

d) transmitting, to the plurality of target devices, a command to request an input voltage value and an input current value of a target device, or a command to request a DC/DC output voltage value and a DC/DC output current value of the target device;

e) receiving, from each of the plurality of target devices, an input voltage value and an input current value of a rectification unit, or the DC/DC output voltage value and the DC/DC output current value;

f) calculating an amount of a power received by each of the plurality of target devices, based on the input voltage value and the input current value, or the DC/DC output voltage value and the DC/DC output current value; and g) calculating a transmission efficiency of the charging power, based on an output voltage level and an output current level of the source resonator, and the amount of a power received by each of the plurality of target devices.

The predetermined selection scheme in the operation a) may correspond to a scheme of selecting matching switches so that the plurality of capacitors may be powered ON and OFF in a sequential order, beginning from a capacitor having a lowest capacitance value to a capacitor having a highest capacitance value, or a scheme of selecting matching switches so that the plurality of capacitors may be powered ON and OFF in a sequential order, beginning from the capacitor having the highest capacitance value to the capacitor having the lowest capacitance value.

The predetermined selection scheme in the operation a) may correspond to a scheme of sequentially selecting M matching switches from the N matching switches, performing the operations b) through g) continuously for each of the M matching switches, and subsequently performing the operations b) through g) continuously for each matching switch, excluding the M matching switches from the N matching switches, M being less than N.

The predetermined selection scheme in the operation a) may correspond to a scheme of classifying the N matching switches into M groups, selecting one of the M groups based on the number of the plurality of target devices, and sequentially selecting matching switches included in the selected group, M being less than N.

In another aspect, there is provided a wireless power receiver including a target resonator configured to receive power from a source resonator through magnetic coupling with the source resonator, and a control and communication unit configured to detect an amount of power received by the target resonator, and to transmit, to the wireless power transmitter, information about the amount of the power received by the target resonator, wherein an impedance of the source resonator is adjusted based on at least one of a reflected wave of the charging power, an amount of a power received by the target resonator, an amount of the charging power, and a transmission efficiency of the charging power.

The wireless power receiver may further comprise a rectification unit configured to generate a direct current (DC) signal by rectifying an alternating current (AC) signal of the power received by the target resonator, and a DC/DC converter configured to supply a voltage of a predetermined level to a load by adjusting a level of the DC signal.

The information about the amount of power received by the target resonator may correspond to an input voltage value and an input current value of the rectification unit, an output voltage value and an output current value of the rectification unit, or a DC/DC output voltage value and a DC/DC output current value.

In one general aspect, there is provided a power receiving method of a wireless power receiver, the method including receiving power from a wireless power transmitter through magnetic coupling, receiving a first power used for charging from the wireless power transmitter, and receiving a second power used for charging, that is generated after an impedance of the source resonator is adjusted in the wireless power transmitter.

The power receiving method may further comprise receiving a wake-up request message from the wireless power transmitter, and transmitting, to the wireless power transmitter, a response message corresponding to the wake-up request message The first power used for charging may be generated by adjusting a signal level of a direct current (DC) voltage to be supplied to a power amplifier of the wireless power transmitter.

The impedance of the source resonator may be adjusted based on one or more of a reflected wave of the first power used for charging, an amount of the first power used for charging, and a transmission efficiency of the first power used for charging.

The response message corresponding to the wake-up request message may comprise one or more of a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a used frequency band of the corresponding target device, an amount of a power to be used for the corresponding target device, an intrinsic identifier of the corresponding target device, and product version information or standards information of the corresponding target device.

The adjusted impedance of the source resonator may correspond to a tracking impedance having a power transmission efficiency above a predetermined threshold, among a plurality of predetermined tracking impedances.

The tracking impedance having the power transmission efficiency above the predetermined threshold may be determined by performing the following operations a) through c) continuously for each of the plurality of predetermined tracking impedances, a) receiving the second power used for charging;
 b) receiving, from the wireless power transmitter, a command to request an input voltage value and an input current value of a target device, or a command to request a DC/DC output voltage value and a DC/DC output current value of the target device; and
 c) transmitting, to the wireless power transmitter, an input voltage value and an input current value of a rectification unit, or the DC/DC output voltage value and the DC/DC output current value.

Other features and aspects will be apparent from the following detailed description, the drawings, and the claims.

BRIEF DESCRIPTION OF THE DRAWINGS

FIG. 2A is a diagram illustrating an example of a power converter and an impedance adjusting unit illustrated in FIG. 1.

FIGS. 8 through 14 are diagrams illustrating examples of various resonators.

Figure 1:
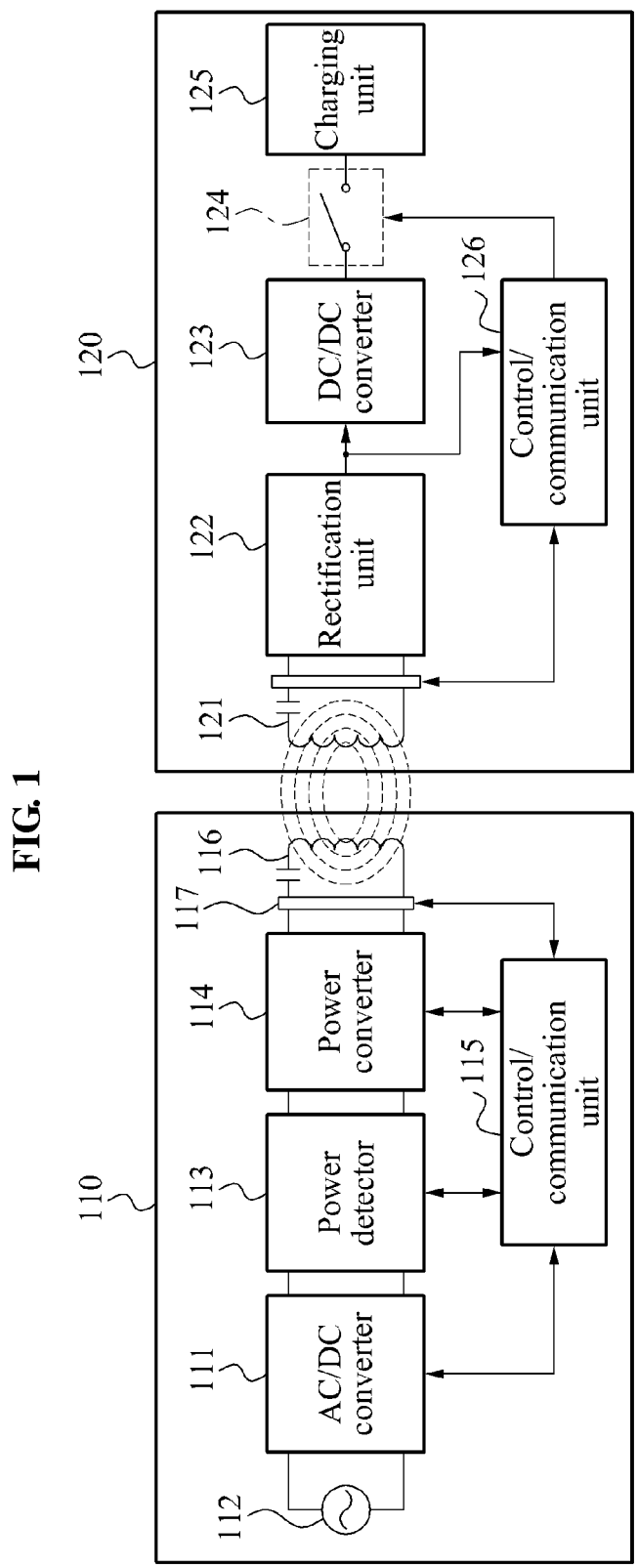
FIG. 1 is a diagram illustrating an example of a wireless power transmission and charging system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Various examples herein are directed towards wireless power transmission and reception. The source and target devices described herein may be or may be included in a terminal. For example, the terminal may include a mobile phone, a computer, a tablet, an appliance, and the like. As an example, the target device may be a terminal and the source device a charging station that may be used to wireless supply power to the terminal.

FIG. 1 illustrates an example of a wireless power transmission and charging system.

Referring to FIG. 1, the wireless power transmission and charging system includes a source device 110 and a target device 120.

In this example, the source device 110 includes an alternating current-to-direct current (AC/DC) converter 111, a power supply 112, a power detector 113, a power converter 114, a control and communication (control/communication) unit 115, an impedance adjusting unit 117, and a source resonator 116. The target device 120 includes a target resonator 121, a rectification unit 122, a DC-to-DC (DC/DC)

converter 123, a switch unit 124, a charging unit 125, and a control/communication unit 126.

The AC/DC converter 111 may generate a DC voltage by rectifying an AC voltage, for example, in a band of tens of hertz (Hz) output from a power supply 112. The AC/DC converter 111 may output a DC voltage of a predetermined level, or may adjust an output level of a DC voltage based on the control of the control/communication unit 115.

The power detector 113 may detect an output current and an output voltage of the AC/DC converter 111. The power detector 113 may transfer, to the control/communication unit 115, information about the detected current and the detected voltage. Additionally, the power detector 113 may detect an input current and an input voltage of the power converter 114.

The power converter 114 may generate a power by converting a DC voltage of a predetermined level to an AC voltage, for example, using a switching pulse signal in a band of a few megahertz (MHz) to tens of MHz. In other words, the power converter 114 may generate a communication power to be used for communication or a charging power to be used for charging in a plurality of target devices, by converting a DC voltage supplied to a power amplifier to an AC voltage using a reference resonance frequency $F_{Ref}$. Examples of the communication power and the charging power are described with reference to FIG. 4.

In various examples herein, the reference resonance frequency may refer to a resonance frequency used by the source device 110. Also, the tracking frequency may refer to a resonance frequency adjusted based on a predetermined scheme.

The impedance adjusting unit 117 may include N matching switches that are connected to a plurality of capacitors. For example, the impedance adjusting unit 117 may adjust an impedance of the source resonator by controlling the N matching switches to be powered ON and OFF. For example, the impedance adjusting unit 117 may include a Pi-matching circuit or a T-matching circuit. An example of the impedance adjusting unit 117 is illustrated in FIG. 2.

The control/communication unit 115 may detect a reflected wave of the communication power or a reflected wave of the charging power, and may detect mismatching that occurs between the target resonator 121 and the source resonator 116 based on the detected reflected wave. The control/communication unit 115 may detect the mismatching by detecting an envelope of the reflected wave, or by detecting an amount of a power of the reflected wave.

The control/communication unit 115 may determine the impedance of the source resonator, and a signal level of a DC voltage that is to be supplied to the power amplifier, based on a number of a plurality of target devices. For example, the control/communication unit 115 may control the N matching switches to be powered ON and OFF, based on a reflected wave of the charging power, an amount of a power received by each of the plurality of target devices, an amount of the charging power, a transmission efficiency of the charging power, and the like.

The control/communication unit 115 may calculate a voltage standing wave ratio (VSWR), based on a voltage level of the reflected wave and a level of an output voltage of the source resonator 116 or the power converter 114. In this example, if the VSWR is less than a predetermined value, the control/communication unit 115 may determine that a mismatch is detected. In this example, the control/communication unit 115 may control the N matching switches to be powered ON and OFF, determine a tracking impedance $Im_{Best}$ that has the highest power transmission efficiency, and change the impedance of the source resonator to the tracking impedance $Im_{Best}$. It should be appreciated, however, that $Im_{Best}$ is merely for purposes of example. For example, the control/communication unit 115 may determine a tracking impedance that has a power transmission efficiency above a predetermined threshold.

The control/communication unit 115 may control a frequency of a switching pulse signal. Under the control of the control/communication unit 115, the frequency of the switching pulse signal may be determined. For example, by controlling the power converter 114, the control/communication unit 115 may generate a modulation signal that is to be transmitted to the target device 120. In other words, the control/communication unit 115 may transmit various messages to the target device 120 via in-band communication. Additionally, the control/communication unit 115 may detect a reflected wave, and may demodulate a signal received from the target device 120 through an envelope of the reflected wave.

The control/communication unit 115 may generate a modulation signal for in-band communication, using various schemes. For example, the control/communication unit 115 may turn on or off a switching pulse signal, may perform delta-sigma modulation, and the like, to generate a modulation signal. Additionally, the control/communication unit 115 may generate a pulse-width modulation (PWM) signal with a predetermined envelope.

The control/communication unit 115 may perform outband communication using a communication channel. For example, control/communication unit 115 may include a communication module, such as a ZigBee module, a BLUETOOTH® module, and the like. The control/communication unit 115 may transmit or receive data to or from the target device 120 via the out-band communication.

The source resonator 116 may transfer electromagnetic energy to the target resonator 121. For example, the source resonator 116 may transfer the communication power or the charging power through magnetic coupling with the target resonator 121.

Likewise, the target resonator 121 may receive the electromagnetic energy from the source resonator 116. For example, the target resonator 121 may receive the communication power or the charging power through magnetic coupling with the source resonator 116. Additionally, the target resonator 121 may receive various messages from the source device 110 via the in-band communication.

The rectification unit 122 may generate a DC voltage by rectifying an AC voltage. For example, the rectification unit 122 may rectify an AC voltage received by the target resonator 121.

The DC/DC converter 123 may adjust a level of the DC voltage that is output from the rectification unit 122, based on a capacity of the charging unit 125. For example, the DC/DC converter 123 may adjust the level of the DC voltage output from the rectification unit 122 from about 3 volts to about 10 volts.

The switch unit 124 may be turned on or off, under the control of the control/communication unit 126. While the switch, unit 124 is turned off, the control/communication unit 115 of the source device 110 may detect a reflected wave. In other words, while the switch unit 124 is turned off, the magnetic coupling between the source resonator 116 and the target resonator 121 may be prevented.

For example, the charging unit 125 may include a battery. The charging unit 125 may charge the battery using a DC voltage output from the DC/DC converter 123.

The control/communication unit 126 may perform in-band communication for transmitting and/or receiving data using a resonance frequency. In this example, the control/communication unit 126 may demodulate a received signal by detecting a signal between the target resonator 121 and the rectification unit 122, or by detecting an output signal of the rectification unit 122. In other words, the control/communication unit 126 may demodulate a message received via the in-band communication.

Additionally, the control/communication unit 126 may adjust an impedance of the target resonator 121, in order to modulate a signal to be transmitted to the source device 110. For example, the control/communication unit 126 may modulate the signal to be transmitted to the source device 110, by turning on or off the switch unit 124. In this example, the control/communication unit 126 may increase the impedance of the target resonator 121 such that a reflected wave may be detected by the control/communication unit 115 of the source device 110. In this example, based on whether the reflected wave is detected, the control/communication unit 115 of the source device 110 may detect a binary number "0" or "1".

The control/communication unit 126 may transmit information to the wireless power transmitter. For example, the control/communication unit 126 may transmit a response message including one or more of a product type of a corresponding target device, manufacturer information of the corresponding target device, a product model name of the corresponding target device, a electric vehicle battery type, a product model name of the electric vehicle, manufacturer information of the electric vehicle, a battery type of the corresponding target device, a charging scheme of the corresponding target device and the electric vehicle, an impedance value of a load of the corresponding target device and the electric vehicle, information about a characteristic of a target resonator of the corresponding target device and the electric vehicle, information about a used frequency band of the corresponding target device and the electric vehicle, an amount of a power to be used for the corresponding target device and the electric vehicle, an intrinsic identifier of the corresponding target device, product version information or standards information of the corresponding target device and the electric vehicle, and the like.

The control/communication unit 126 may also perform an out-band communication using a communication channel. For example, the control/communication unit 126 may include a communication module, such as a ZigBee module, a BLUETOOTH® module, and the like. The control/communication unit 126 may transmit or receive data to or from the source device 110 via the out-band communication.

The control/communication unit 126 may receive a wake-up request message from the wireless power transmitter, detect an amount of a power received by the target resonator, and transmit, to the wireless power transmitter, information about the amount of the power received by the target resonator. For example, the information about the amount of the power received by the target resonator may include an input voltage value and an input current value of the rectification unit 122, an output voltage value and an output current value of the rectification unit 122, an output voltage value and an output current value of the DC/DC converter 123, and the like.

The control/communication unit 115 may set a resonance bandwidth of the source resonator 116. Based on the set resonance bandwidth of the source resonator 116, a Q-factor ($Q_S$) of the source 116 may be determined.

Likewise, the control/communication unit 126 may set a resonance bandwidth of the target resonator 116. Based on the set resonance bandwidth of the target resonator 116, a Q-factor of the target resonator 121 may be determined. For example, the resonance bandwidth of the source resonator 116 may be set wider or narrower than the resonance bandwidth of the target resonator 121. Via a communication, the source device 110 and the target device 120 may share information about the resonance bandwidths of the source resonator 116 and the target resonator 121. For example, if a power higher than a reference value is requested from the target device 120, the Q-factor (Qs) of the source resonator 116 may be set to a value greater than 100. As another example, if a power lower than the reference value is requested from the target device 120, the Q-factor (Qs) of the source resonator 116 may be set to a value less than 100.

Qt indicates a Q-factor based on a change in a distance between the source resonator 116 and the target resonator 121. In this example, a change in a resonance impedance, impedance-mismatching, a reflected signal, and the like, Qt may be in inverse proportion to a resonance bandwidth, as given in Equation 1.

$$\frac{\Delta f}{f_0} = \frac{1}{Qt} \qquad \text{[Equation 1]}$$
$$= \Gamma_{S,D} + \frac{1}{BW_S} + \frac{1}{BW_D}$$

In Equation 1, $f_c$, denotes a center frequency, $\Delta f$ denotes a bandwidth, $\Gamma_{S,D}$ denotes reflection loss between resonators, $BW_S$ denotes a resonance bandwidth of the source resonator 116, and $BW_D$ denotes a resonance bandwidth of the target resonator 121.

In a wireless power transmission, an efficiency U of the wireless power transmission may be represented by Equation 2.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa} \qquad \text{[Equation 2]}$$

In Equation 2, K denotes a coupling coefficient about energy coupling between the source resonator 116 and the target resonator 121, $\Gamma_S$ denotes a reflection coefficient of the source resonator 116, $\Gamma_D$ denotes a reflection coefficient of the target resonator 121, $\omega_0$ denotes a resonance frequency, M denotes a mutual inductance between the source resonator 116 and the target resonator 121, $R_S$ denotes an impedance of the source resonator 116, $R_D$ denotes an impedance of the target resonator 121, $Q_S$ denotes a Q-factor of the source resonator 116, $Q_D$ denotes a Q-factor of the target resonator 121, and $Q_K$ denotes a Q-factor about energy coupling between the source resonator 116 and the target resonator 121.

Referring to Equation 2, the Q-factor may be associated with an efficiency of the wireless power transmission.

Accordingly, the Q-factor may be set to a greater value in order to increase the efficiency of the wireless power transmission. In this example, if $Q_S$ and $Q_D$ are set to a greater value, the efficiency of the wireless power transmission may be reduced based on, for example, a change in the coupling coefficient K regarding the energy coupling, a change in a distance between the source resonator 116 and the target resonator 121, a change in a resonance impedance, impedance mismatching, and the like.

Resonance bandwidths may be set narrow to increase efficiency of a wireless power transmission. If each of the resonance bandwidths of the source resonator 116 and the target resonator 121 is set to be too narrow, the impedance mismatching and the like may easily occur due to insignificant external influences. In consideration of the impedance mismatching, Equation 1 may be expressed by Equation 3.

$$\frac{\Delta f}{f_0} = \frac{\sqrt{VSWR} - 1}{Qt\sqrt{VSWR}}$$ [Equation 3]

If the resonance bandwidth between the source resonator 116 and the target resonator 121, or a bandwidth of a impedance-matching frequency remains unbalanced, the efficiency of the wireless power transmission may be reduced based on, for example, a change in the coupling coefficient K, a change in a distance between the source resonator 116 and the target resonator 121, a change in a resonance impedance, impedance mismatching, and the like. According to Equation 1 through Equation 3, if the resonance bandwidth between the source resonator 116 and the target resonator 121, or the bandwidth of impedance-matching frequency remains unbalanced, the Q-factor of the source resonator 116 and the Q-factor of the target resonator 121 may remain unbalanced.

FIG. 2A illustrates an example of the power converter 114 and the impedance adjusting unit 117 which are illustrated in FIG. 1.

Referring to FIG. 2A, the power converter 114 includes a switching pulse signal generator 210 and a power amplifier 220. The impedance adjusting unit 117 includes N matching switches that are connected to a plurality of capacitors, for example, matching switches 231, 233, 235, and 237. Each of the N matching switches may be powered ON and OFF based on a control signal that is input by the control/communication unit 115. In this example, N may be an integer that is greater than 2. As an example, the matching switch 237 may be constantly in an ON state, and only one of the other matching switches 231, 233, and 235 may be in an ON state. For example, the matching switch 237 and the matching switch 235 may be simultaneously powered ON. The plurality of capacitors connected to each of the matching switches 231, 233, 235, and 237 may have different capacitance values. For example, the plurality of capacitors may be arranged in an order, starting from a capacitor having the greatest capacitance value. In this example, a capacitance value of a capacitor connected to the matching switch 233 may be greater than a capacitance value of a capacitor connect to the matching switch 231.

The switching pulse signal generator 210 may generate a switching pulse signal, for example, in a band of a few MHz to tens of MHz. A frequency of the generated switching pulse signal may be determined based on the control of the control/communication unit 115. For example, if a reference resonance frequency of the source resonator 116 corresponds to 13.56 MHz or 5.78 MHz, the control/communication unit 115 may control the switching pulse signal generator 210 to generate a switching pulse signal that has a frequency of 13.56 MHz or 5.78 MHz. The switching pulse signal generator 210 may include a plurality of capacitors, and a switch. In this example, the switching pulse signal generator 210 may adjust the frequency of the switching pulse signal by switching the plurality of capacitors.

The power amplifier 220 may generate an AC power using a switching pulse signal that is output from a resonance frequency generator. That is, the power amplifier 220 may generate a communication power used for communication and/or a charging power used for charging, by switching an input voltage of the power amplifier 220 based on the switching pulse signal.

The control/communication unit 115 may adjust a signal level of the input voltage of the power amplifier 220 based on a number of the plurality of target devices. Further, the control/communication unit 115 may control the N matching switches to be powered ON and OFF based on, for example, a reflected wave of charging power, an amount of a power received by each of the plurality of target devices, an amount of the charging power, a transmission efficiency of the charging power, and the like.

FIGS. 2B through 2H illustrate various impedance adjusting units.

Figure 2B:
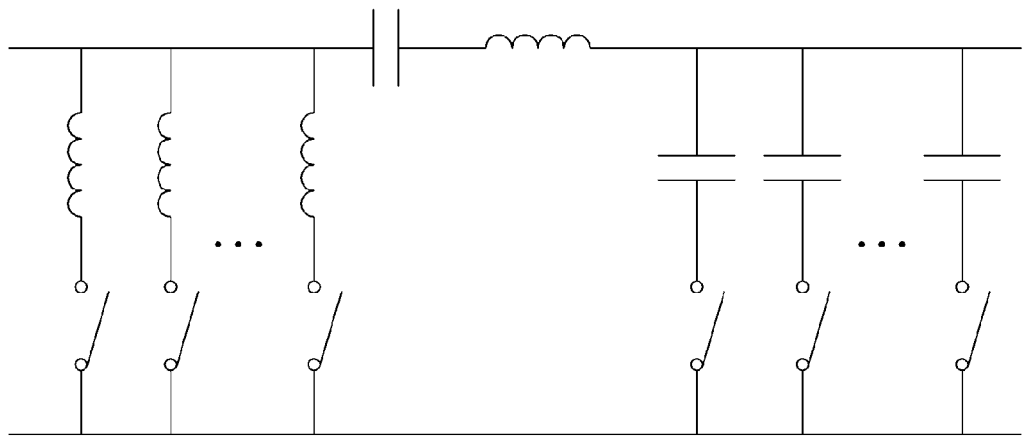
FIGS. 2B through 2H are diagrams illustrating examples of various impedance adjusting units.
Figure 2C:
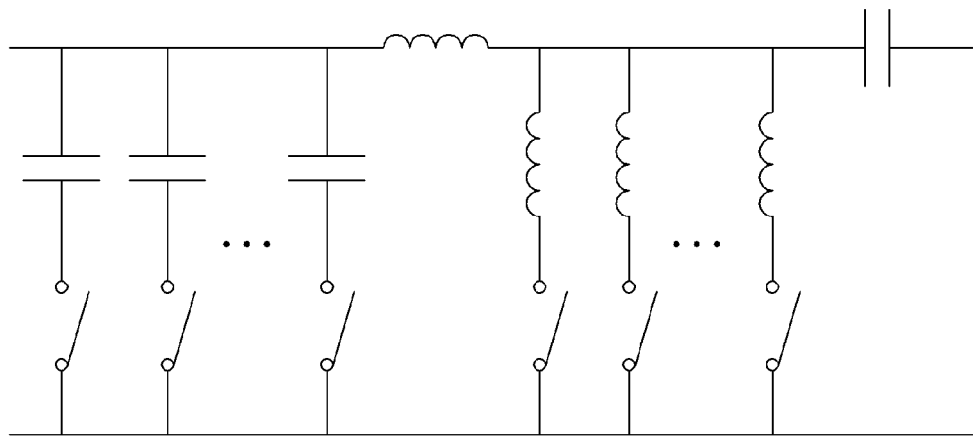
Figure 2D:
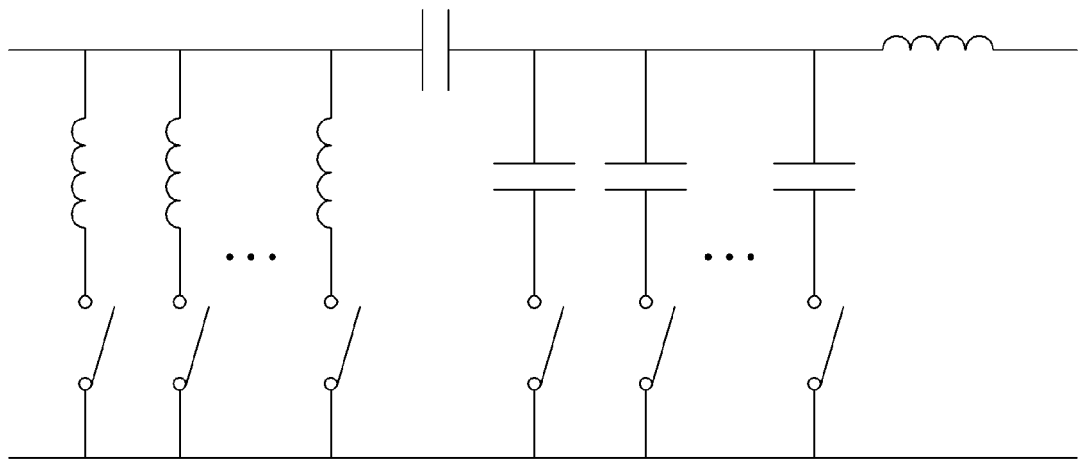
Figure 2E:
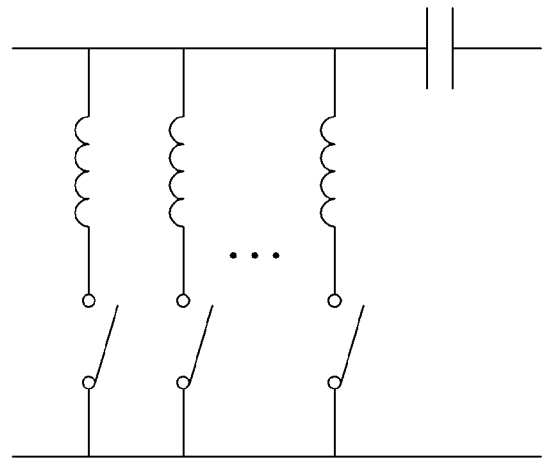
Figure 2F:
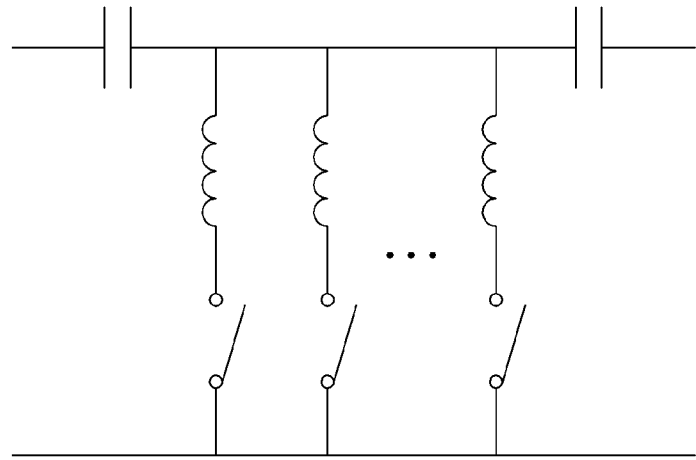
Figure 2G:
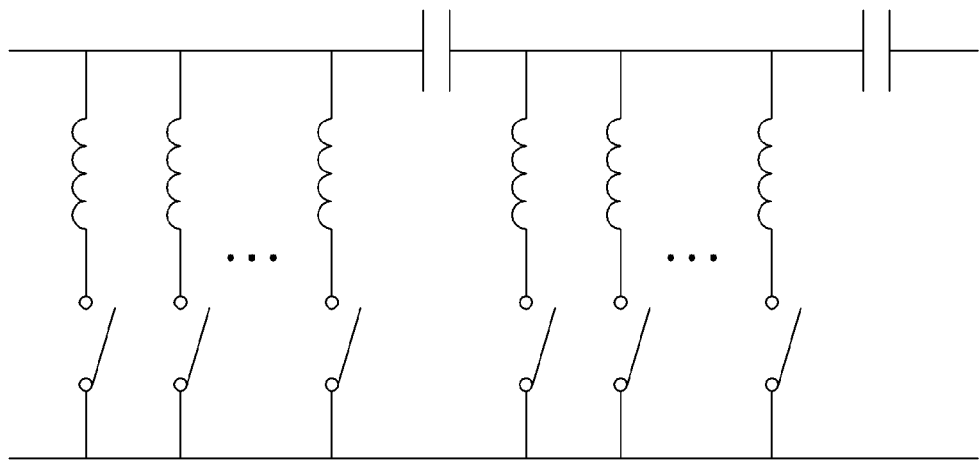
Figure 2H:
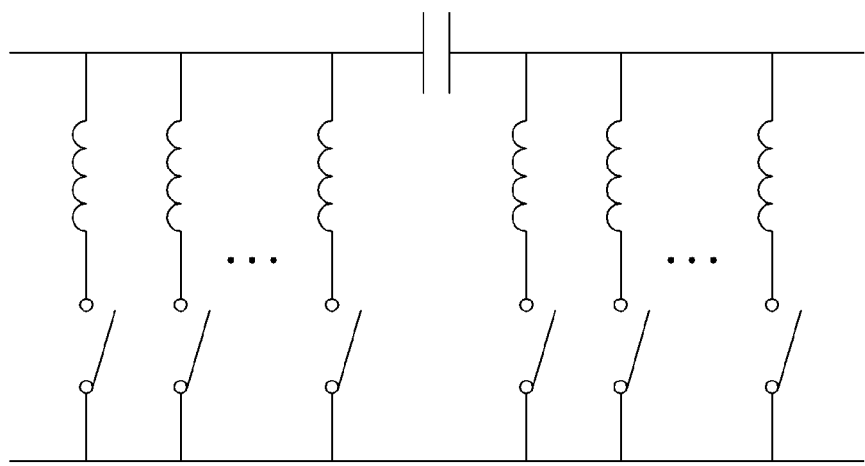

As illustrated in the examples of FIGS. 2B through 2H, N matching switches may be connected to a plurality of capacitors or a plurality of inductors. Referring to FIGS. 2B through 2D, one of the matching switches connected to inductors may be powered ON, and simultaneously one of the matching switches connected to capacitors may be powered ON. Accordingly, for example, the impedance adjusting unit 117 illustrated in FIGS. 2B through 2D may be operated in a pi-type circuit. Referring to FIGS. 2E and 2F, N matching switches may be connected to a plurality of inductors. Referring to FIGS. 2G and 2H, the impedance adjusting unit 117 may include inductors that are connected to both ends of a capacitor in parallel.

Figure 3:
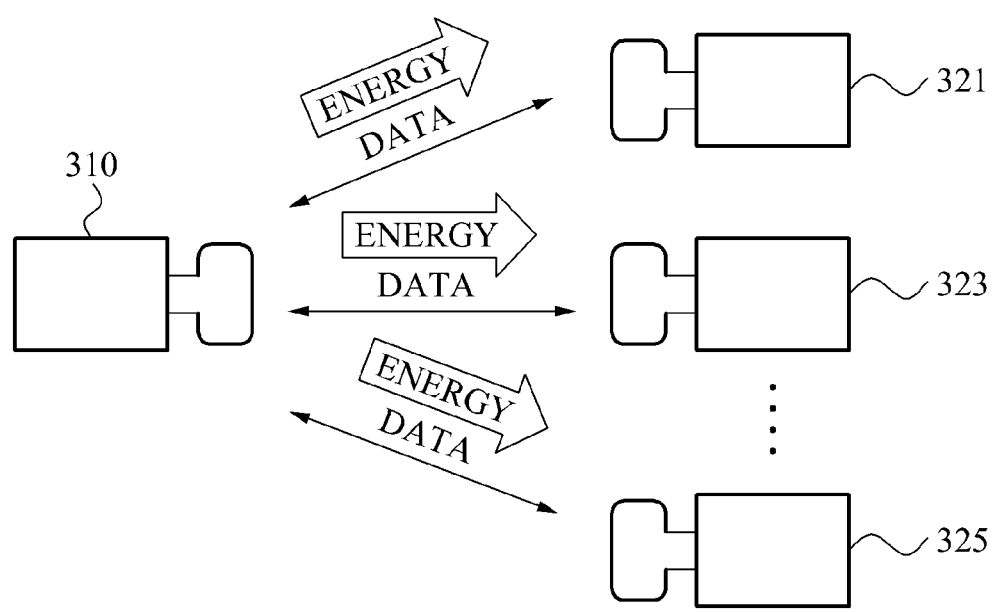
FIG. 3 is a diagram illustrating an example of an operation environment of a wireless power transmission and charging system.

FIG. 3 illustrates an example of an operation environment of a wireless power transmission and charging system.

Referring to FIG. 3, a source device 310 may wirelessly transmit energy to a plurality of target devices 321, 323, and 325. That is, according to a resonance-based wireless power transmission scheme, the single source device 310 may simultaneously charge the plurality of target devices 321, 323, and 325.

According to the resonance-based wireless power transmission scheme, for example, the source device 310 and the plurality of target devices 321, 323, and 325 may transmit and receive data via an in-band communication, or an out-band communication.

In an in-band communication scheme, power and a signal may be transmitted within a coupling area between a source resonator and a target resonator. In contrast to an out-band communication scheme, the in-band communication scheme may cause a little interference in peripheral devices. For example, the out-band communication may refer to a communication using a communication channel, such as a ZigBee channel, a BLUETOOTH® channel, and the like. In the in-band communication, data may be transmitted using a power transmitting channel.

Figure 4:
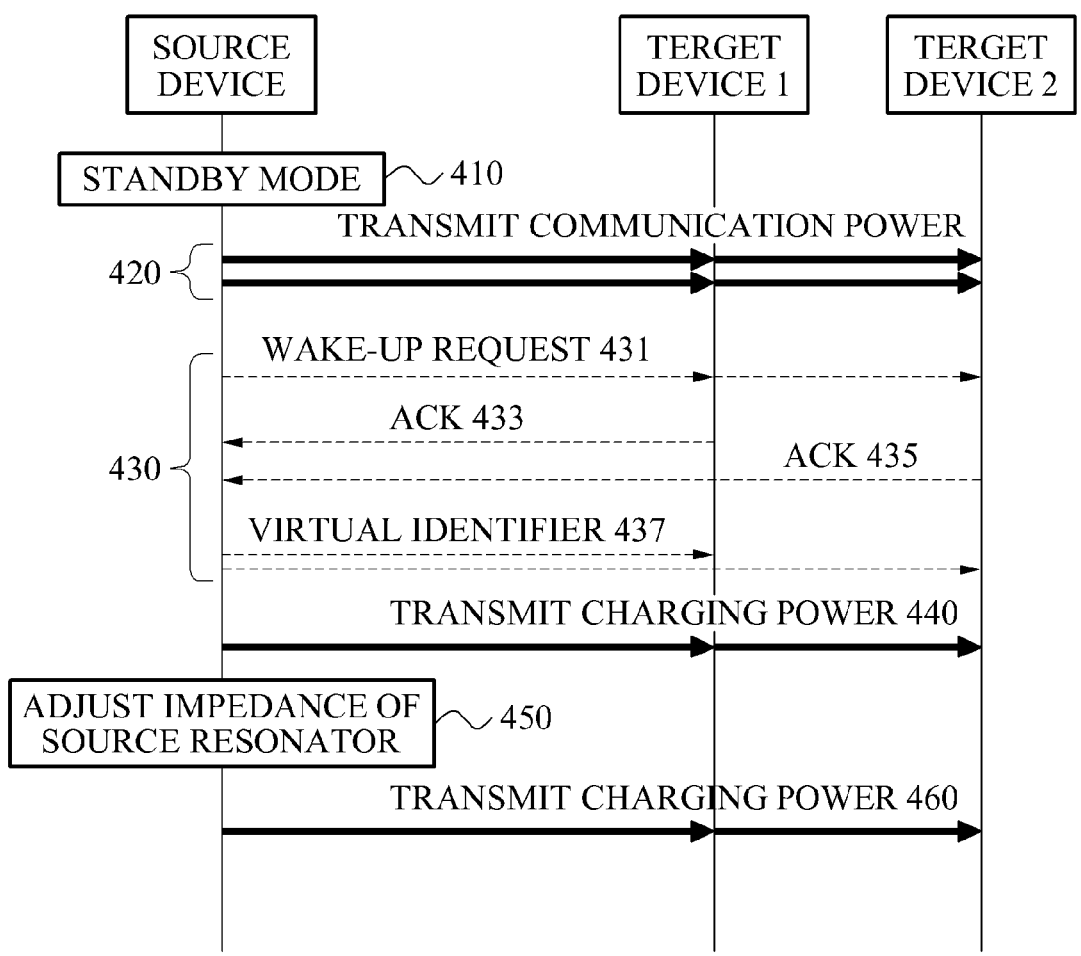
FIG. 4 is a diagram illustrating an example of an impedance control method.

FIG. 4 illustrates an example of an impedance control method.

In the example illustrated in FIG. 4, a source device, a target device 1, and a target device 2 may transmit and receive data via an in-band communication. Also, the source device, the target device 1, and the target device 2 may transmit and receive data via an out-band communication.

Referring to FIG. 4, in 410, the source device is operated in a standby mode while a target is not detected. If the target device 1 and the target device 2 are detected while in the standby mode, the source device may generate communication power to be used in the target device. That is, the source device may generate the communication power to be used by a plurality of target devices, by converting a DC voltage to be supplied to the power amplifier 220 of FIG. 2 to an AC voltage using a reference resonance frequency. In this example, the source device may transmit a test signal at each predetermined period, or may detect the target device 1 or the target device 2 using a pressure sensor. For example, if the target device 1 is disposed on the source device, the source device may detect the target device 1 using the pressure sensor included in the source device. The source device may be switched from the standby mode to an access mode by a predetermined control signal. In the access mode, operations in 420 and 430 of FIG. 4 may be performed.

In 420, the source device transmits communication power to the target device 1 and/or the target device 2 through magnetic coupling. That is, the source device may transmit communication power to the plurality of target devices using the magnetic coupling. The source device may generate the communication power used in the target device, by converting a DC voltage to be supplied to the power amplifier 220 to an AC voltage using a resonance frequency. In this example, communication power may refer to energy used for activating a communication module and a processor of each of the target devices. The communication power may be transmitted at a predetermined time in the form of a constant wave (CW). The target device 1 and the target device 2 may receive power for operating their respective communication modules and processors, by receiving the communication power.

In 430, the source device wakes up the target device. In 430, for example, the target device may receive a wake-up request message from the source device, and may be assigned a virtual identifier. That is, in 430, the target device 1 and the target device 2 may activate a communication and control function by receiving the wake-up request message, and may each be assigned a virtual identifier from the source device.

Operation 430 includes operation 431 in which the source device transmits a wake-up request message to the target device 1 and the target device 2. In 433, the source device receives an acknowledge (ACK) message from the target device 1, and in 435 the source device receives an ACK message from the target device 2. For example, in 431, the source device may transmit a wake-up request message to a plurality of target devices. In 433 and 435, the source device may receive response messages corresponding to the wake-up request message from each of the plurality of target devices. The source device may detect the number of target devices based on the received response messages. In this example, a response message and an ACK message may refer to the same message.

For example, the ACK messages may include identifier information of each of the target device 1 and the target device 2. The identifier information included in the ACK message may correspond to an intrinsic identifier of each of the target device 1 and the target device 2. Each of the response messages corresponding to the wake-up request message may include, for example, one or more of a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a used frequency band of the corresponding target device, an amount of a power to be used for the corresponding target device, an intrinsic identifier of the corresponding target device, product version information or standards information of the corresponding target device, and the like.

Operation 430 further includes operation 437 in which a virtual identifier is assigned to each of the target devices. The virtual identifier may be used instead of the intrinsic identifier of each of the target device 1 and the target device 2. The virtual identifier may correspond to a temporary identifier that may be used for charging. For example, the virtual identifier may be assigned using numbers from 1 to 8 based on a sequence of access. In contrast to the intrinsic identifier, the virtual identifier may be simply used for classifying the target device in 440 through 460. In various examples, the intrinsic identifier may corresponds to long data of a byte scale, including a product model name, a serial number of product, manufacturer information, and the like, whereas the virtual identifier may correspond to short data corresponding to 3 to 4 bits.

In 440, the source device generates a charging power, and transmits the charging power to the plurality of target devices through magnetic coupling. In other words, in 440, the source device may generate the charging power by adjusting a signal level of the DC voltage to be supplied to the power amplifier 220 based on the number of the plurality of target devices.

Also, in 440, the source device may determine an impedance of a source resonator based on the number of target devices. In this example, the determined impedance of the source resonator may be referred to as a reference impedance. The reference impedance may be determined based on a number target devices, and/or an impedance value of a load of each of the plurality of target devices. For example, if the number of target devices is set to at least 3, the reference impedance may be determined to be greater than 50 ohms (Ω). Also, the reference impedance may be determined as a value obtained by connecting impedance values of loads of target devices in parallel.

The source device may change the impedance of the source resonator to the reference impedance, by controlling each of the N matching switches to be powered ON and/or OFF. In 440, the source device may transmit the charging power to the target device 1 and the target device 2. As described herein, the DC voltage to be supplied to the power amplifier 220 may refer to the input voltage of the power amplifier 220 of FIG. 2A. The charging power may be constantly transmitted during a predetermined time, and may be transmitted at a higher power level in comparison to the communication power. For example, a power level of the communication power may correspond to 0.1 to 1 Watt, whereas a power level of the charging power may be 1 to 20 Watt.

In 440, the control/communication unit 115 of the source device may determine a signal level of the DC voltage to be input to the power amplifier 220, based on, for example, one or more of the product type of the corresponding target device, the manufacturer information of the corresponding target device, the product model name of the corresponding target device, the battery type of the corresponding target device, the charging scheme of the corresponding target device, the impedance value of the load of the corresponding target device, the information about the characteristic of the target resonator of the corresponding target device, the information about the used frequency band of the corresponding target device, the amount of the power to be used for the corresponding target device, and the like.

For example, the source device may determine the level of the DC voltage that is input to the power amplifier 220 to be a predetermined value, based on a battery type of the target device 1 and a battery type of the target device 2. In this example, the source device may refer to a look-up table mapped to information of a target device, and may determine the level of the DC voltage that is input to the power amplifier 220 to be the predetermined value based on data included in the look-up table.

Figure 5:
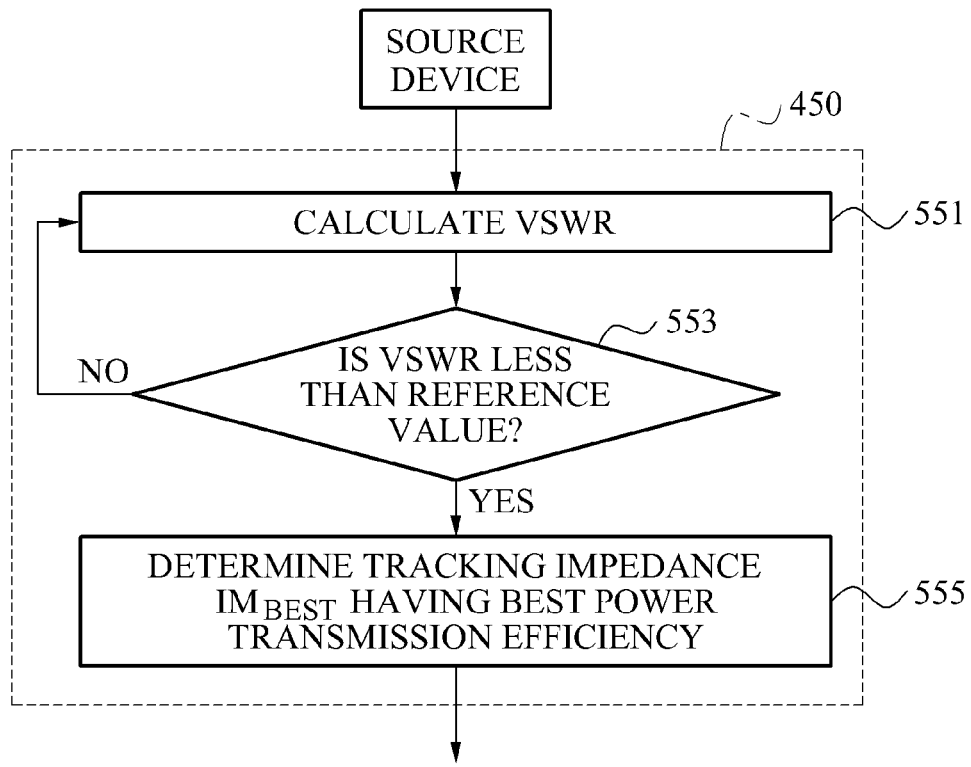
FIG. 5 is a diagram illustrating an example of an operation of adjusting an impedance illustrated in FIG. 4.

In 450, the source device adjusts the impedance of the source resonator, based on a reflected wave of the charging power and a transmission efficiency of the charging power. Operation 450 performed by the source device may include operations 551 through 555 as illustrated in the example of FIG. 5.

In 460, the source device transmits a charging power used for charging. In FIG. 4, although the operations 440 through 460 are separately illustrated, the charging power may be transmitted constantly, without discontinuity. That is, the charging power may be constantly transmitted while the impedance of the source resonator is adjusted. However, because the charging power transmitted in 460 may be a power transmitted after an impedance-matching is completed, the charging power transmitted in 460 may have a better power transmission efficiency in comparison to the charging power transmitted in 440.

In FIG. 4, the charging power in 440 is referred to as a first charging power, and the charging power in 460 is referred to as a second charging power. Accordingly, a wireless power receiver may receive the first charging power from a wireless power transmitter, and receive the second charging power generated after the impedance of the source resonator is adjusted, in the wireless power transmitter. For example, the impedance of the source resonator may be adjusted based on a reflected wave of the first charging power, an amount of the first charging power, a transmission efficiency of the first charging power, and the like.

In 450, the wireless power receiver may continuously perform a) receiving the second charging power, b) receiving, from the wireless power transmitter, a request for an input voltage value and an input current value of a target device, or a request for a DC/DC output voltage value and a DC/DC output current value of the target device, and c) transmitting, to the wireless power transmitter, the requested input voltage value and input current value of a rectification unit, or the requested DC/DC output voltage value and the DC/DC output current value.

FIG. 5 illustrates an example of an operation of adjusting impedance.

Referring to FIG. 5, in 551, a source device calculates a voltage standing wave ratio (VSWR) based on a voltage level of a reflected wave, and a level of an output voltage and a level of an output current of the source resonator.

In 553, the source device determines whether the calculated VSWR is less than a predetermined value. For example, if the VSWR is less than the predetermined value, the source device may control N matching switches to be powered ON and OFF, and may determine a tracking impedance $Im_{Best}$ that has the highest power transmission efficiency, in 555. In this example, the tracking impedance $Im_{Best}$ may be determined by performing operations 610 through 660 of FIG. 6 continuously for each of the N matching switches. After performing the operation in 555, the source device may change the impedance of the source resonator to the tracking impedance $Im_{Best}$.

Figure 6:
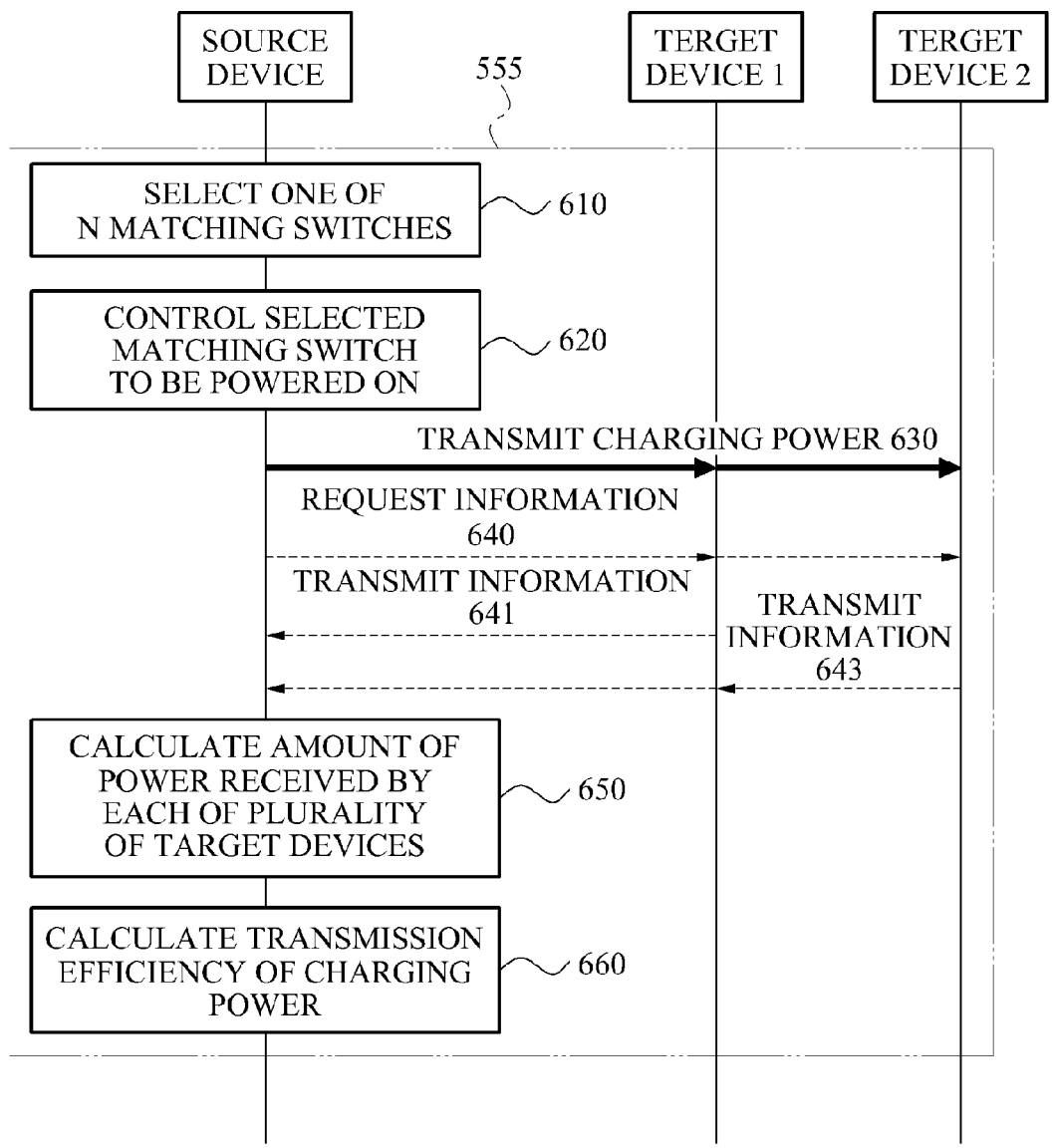
FIG. 6 is a diagram illustrating an example of a method of selecting a tracking impedance having the highest power transmission efficiency illustrated in FIG. 5.

FIG. 6 illustrates an example of a method of selecting the tracking impedance $Im_{Best}$ that has the highest power transmission efficiency.

For example, operations 610 through 660 of FIG. 6 may be performed by the control/communication unit 115 of FIG. 1 or FIG. 2A.

Referring to FIG. 6, in 610, a source device selects one of N matching switches based on a predetermined selection scheme. For example, the predetermined selection method may be one of schemes illustrated in FIGS. 7A through 7C.

In 620, the source device changes an impedance of a source resonator to a selected impedance $Im_{Selected}$, by controlling the selected matching switch to be powered ON.

In 630, the source device transmits a charging power to be used for charging. For example, the charging power transmitted in 630 may correspond to a power transmitted when the impedance of the source resonator corresponds to the selected impedance $Im_{Selected}$.

In 640, the source device requests information from target devices. That is, the source device may transmit, to the plurality of target devices, a command requesting an input voltage value and an input current value of a target device, or a command requesting a DC/DC output voltage value and a DC/DC output current value of the target device.

In 641 and 643, the source device receives, from each of the plurality of target devices, the requested input voltage value and an input current value of a rectification unit, or the requested DC/DC output voltage value and the DC/DC output current value.

In 650, the source device calculates an amount of a power received by each of the plurality of target devices, based on the input voltage value and the input current value, or the DC/DC output voltage value and the DC/DC output current value.

In 660, the source device calculates a transmission efficiency of the charging power, based on a level of an output voltage and a level of an output current of a source resonator, and the amount of the power received by each of the plurality of target devices. For example, the level of the output voltage and the output current of the source resonator may correspond to a level of the input voltage of the power amplifier 220 illustrated in FIG. 2A, and a level of a current flowing into the power amplifier 200. As another example, the level of the output voltage and the output current of the source resonator may correspond to a level of an output voltage and a level of an output current of the power converter 114 of FIG. 1. The power transmission efficiency may be calculated based on a summation of the amounts of power received by each of the target devices, and a ratio of a level of an output power of the source resonator. The level of the output power of the source resonator may correspond to a value that is obtained by multiplying a level of an output voltage and a level of an output current of the source resonator.

Figure 7A:
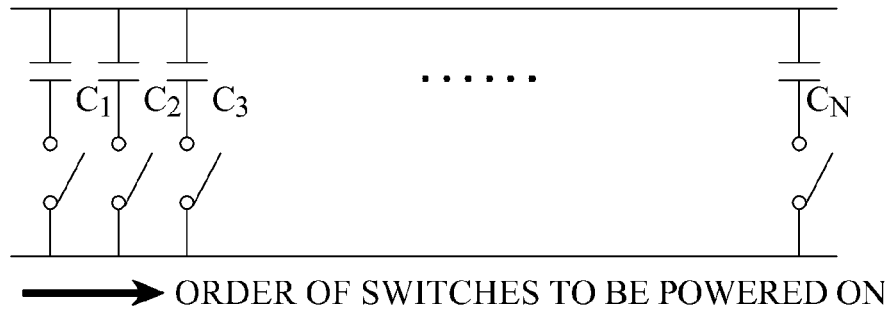
FIGS. 7A through 7C are diagrams illustrating examples of schemes of selecting matching switches.
Figure 7B:
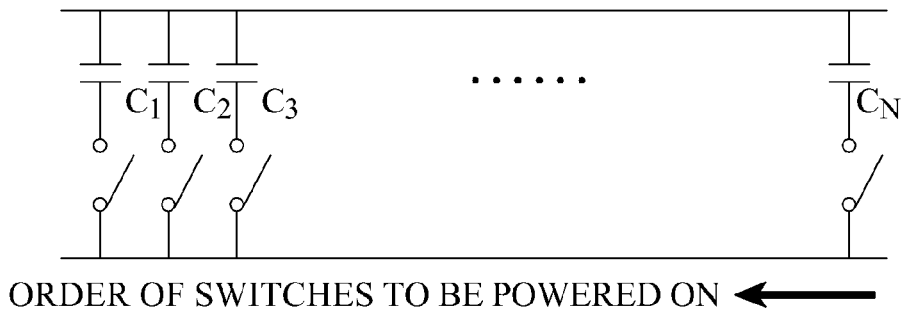
Figure 7C:
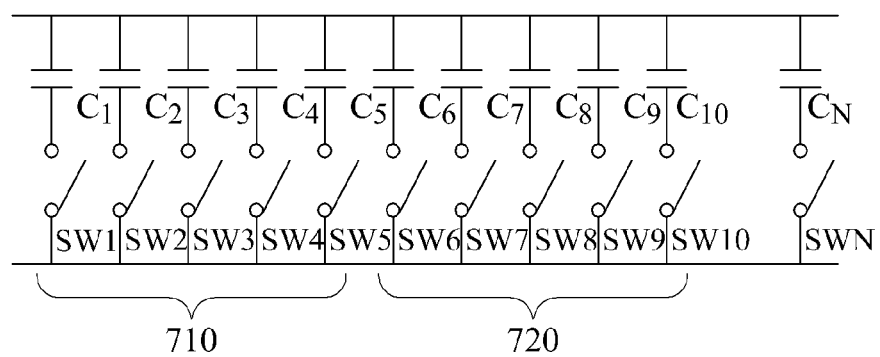

FIGS. 7A through 7C illustrate examples of schemes of selecting matching switches.

FIG. 7A illustrates a scheme of selecting matching switches such that a plurality of capacitors may be powered ON and OFF in a sequential order, starting from a capacitor having a low capacitance value to a capacitor having a high capacitance value.

FIG. 7B illustrates a scheme of selecting matching switches such that a plurality of capacitors may be powered ON and OFF in a sequential order, starting from a capacitor having a high capacitance value to a capacitor having a low capacitance value.

FIG. 7C illustrates a scheme of sequentially selecting M predetermined matching switches from among N matching switches, for performing the operations 620 through 660 continuously for each of the M matching switches, and for secondarily performing the operations 620 through 660 continuously for each matching switch, excluding the M matching switches from the N matching switches. In this example, M may be less than N. That is, in the scheme of FIG. 7C, a source device may select SW3 and SW8, and may perform the operations 620 through 660 continuously for SW3 and SW8. Then, the source device may perform the operations 620 through 660 continuously for SW1, SW2, SW4, SW5, SW6, SW7, SW9, SW10, and SW11 through SWN, excluding SW3 and SW8.

The source device may employ a scheme of classifying N matching switches into M groups, for example, a first group 710 and a second group 720, selecting one of the M groups based on a number of target devices, and sequentially selecting matching switches included in the selected group. For example, if a number of target devices is set to less than 4, the source device may select the first group 710, and may perform operations 620 through 660 continuously for SW1, SW2, SW3, SW4, and SW5 included in the first group 710.

In a wireless power transmission and charging system, a loss of transmission power may be reduced by controlling a resonance frequency, without a separate matching circuit.

In a wireless power transmission and charging system, a resonance frequency may be controlled based on a power transmission efficiency.

In various examples, a source resonator, a repeater resonator, and/or a target resonator may be configured as a helix coil structured resonator, a spiral coil structured resonator, a meta-structured resonator, or the like.

FIG. 8 is an example of a two-dimensional (2D) illustration of a resonator.

Referring to FIG. 8, resonator 800 includes a transmission line, a capacitor 820, a matcher 830, and conductors 841 and 842. The transmission line includes a first signal conducting portion 811, a second signal conducting portion 812, and a ground conducting portion 813.

The capacitor 820 may be inserted in series between the first signal conducting portion 811 and the second signal conducting portion 812, and an electric field may be confined within the capacitor 820. The transmission line may include at least one conductor in an upper portion of the transmission line, and at least one conductor in a lower portion of the transmission line. Current may flow through the at least one conductor disposed in the upper portion of the transmission line and the at least one conductor disposed in the lower portion of the transmission may be electrically grounded. A conductor disposed in an upper portion of the transmission line may be referred to as the first signal conducting portion 811 and the second signal conducting portion 812. A conductor disposed in the lower portion of the transmission line may be referred to as the ground conducting portion 813.

The transmission line may include the first signal conducting portion 811 and the second signal conducting portion 812 in the upper portion of the transmission line, and may include the ground conducting portion 813 in the lower portion of the transmission line. The first signal conducting portion 811 and the second signal conducting portion 812 may face the ground conducting portion 813. For example, current may flow through the first signal conducting portion 811 and the second signal conducting portion 812.

In this example, one end of the first signal conducting portion 811 is shorted to a conductor 842, and another end of the first signal conducting portion 811 is connected to the capacitor 820. One end of the second signal conducting portion 812 is shorted to the conductor 841, and another end of the second signal conducting portion 812 is connected to the capacitor 820. Accordingly, the first signal conducting portion 811, the second signal conducting portion 812, the ground conducting portion 813, and the conductors 841 and 842 are connected to each other such that the resonator 800 may have an electrically closed-loop structure. The term "loop structure" may include a polygonal structure, for example, a circular structure, a rectangular structure, and the like. "Having a loop structure" indicates a circuit that is electrically closed.

The capacitor 820 may be inserted into an intermediate portion of the transmission line. For example, the capacitor 820 may be inserted into a space between the first signal conducting portion 811 and the second signal conducting portion 812. The capacitor 820 may have a shape of a lumped element, a distributed element, and the like. As an example, a distributed capacitor having the shape of the distributed element may include zigzagged conductor lines and a dielectric material having a relatively high permittivity and that is located between the zigzagged conductor lines.

If the capacitor 820 is inserted into the transmission line, the resonator 800 may have a property of a metamaterial. A metamaterial indicates a material that has an electrical property that has not been discovered in nature and thus, may have an artificially designed structure. An electromagnetic characteristic of all the materials existing in nature have a unique magnetic permeability or a unique permittivity. Most materials have a positive magnetic permeability or a positive permittivity. In the case of most materials, a right hand rule may be applied to an electric field, a magnetic field, and a pointing vector, and thus, the corresponding materials may be referred to as right handed materials (RHMs). However, a metamaterial has a magnetic permeability or a permittivity that is absent in nature, and thus, may be classified into, for example, an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

The resonator 800 may have a negative magnetic permeability by appropriately adjusting the capacitance of the capacitor 820. In this example, the resonator 800 may also be referred to as an MNG resonator. Various criteria may be applied to determine the capacitance of the capacitor 820. For example, the various criteria may include a criterion for enabling the resonator 800 to have the characteristic of the metamaterial, a criterion for enabling the resonator 800 to have a negative magnetic permeability in a target frequency, a criterion for enabling the resonator 800 to have a zeroth order resonance characteristic in the target frequency, and the like. Based on at least one criterion from among the aforementioned criteria, the capacitance of the capacitor 820 may be determined.

The resonator 800, also referred to as the MNG resonator 800, may have a zeroth order resonance characteristic of having, as a resonance frequency, a frequency in which a propagation constant is "0". Because the resonator 800 may have the zeroth order resonance characteristic, the resonance frequency may be independent with respect to a physical size of the MNG resonator 800. By appropriately designing the capacitor 820, the MNG resonator 800 may sufficiently change the resonance frequency. Accordingly, the physical size of the MNG resonator 800 may not be changed.

In a near field, the electric field may be concentrated on the capacitor 820 inserted into the transmission line. In this example, due to the capacitor 820, the magnetic field may become dominant in the near field. The MNG resonator 800 may have a relatively high Q-factor using the capacitor 820 of the lumped element, and thus, it is possible to enhance an efficiency of power transmission. A Q-factor indicates a level of an ohmic loss or a ratio of a reactance with respect to a resistance in the wireless power transmission. The efficiency of the wireless power transmission may increase according to an increase in the Q-factor.

The matcher 830 may adjust a strength of a magnetic field of the MNG resonator 800. Accordingly, an impedance of the MNG resonator 800 may be determined by the matcher 830. Current may flow in the MNG resonator 800 via a connector, or may flow out from the MNG resonator 800 via the connector. The connector may be connected to the ground conducting portion 813 or the matcher 830. For example, a physical connection may be formed between the connector and the ground conducting portion 813, or between the connector and the matcher 830. As another example, power may be transferred through coupling, without using a physical connection between the connector and the ground conducting portion 813 or the matcher 830.

For example, as shown in FIG. 8, the matcher 830 may be positioned within the loop formed by the loop structure of the resonator 800. The matcher 830 may adjust the impedance of the resonator 800 by changing the physical shape of the matcher 830. For example, the matcher 830 includes the conductor 831 for the impedance-matching in a location that is separated from the ground conducting portion 813 by a distance h. In this example, the impedance of the resonator 800 may be changed by adjusting the distance h.

Although not illustrated in FIG. 8, a controller may be provided to control the matcher 830. In this example, the matcher 830 may change the physical shape of the matcher 830 based on a control signal generated by the controller. For example, the distance h between a conductor 831 of the matcher 830 and the ground conducting portion 813 may increase or decrease based on the control signal. Accordingly, the physical shape of the matcher 830 may be changed and the impedance of the resonator 800 may be adjusted.

As shown in FIG. 8, the matcher 830 may be configured as a passive element such as the conductor 831. For example, the matcher 830 may be an active element such as a diode, a transistor, and the like. If the active element is included in the matcher 830, the active element may be driven based on the control signal generated by the controller, and the impedance of the resonator 800 may be adjusted based on the control signal. In an example in which a diode is included in the matcher 830, the impedance of the resonator 800 may be adjusted based on whether the diode is in an on state or in an off state.

Although not illustrated in FIG. 8, a magnetic core may pass through the MNG resonator 800. The magnetic core may increase a power transmission distance.

Figure 9:
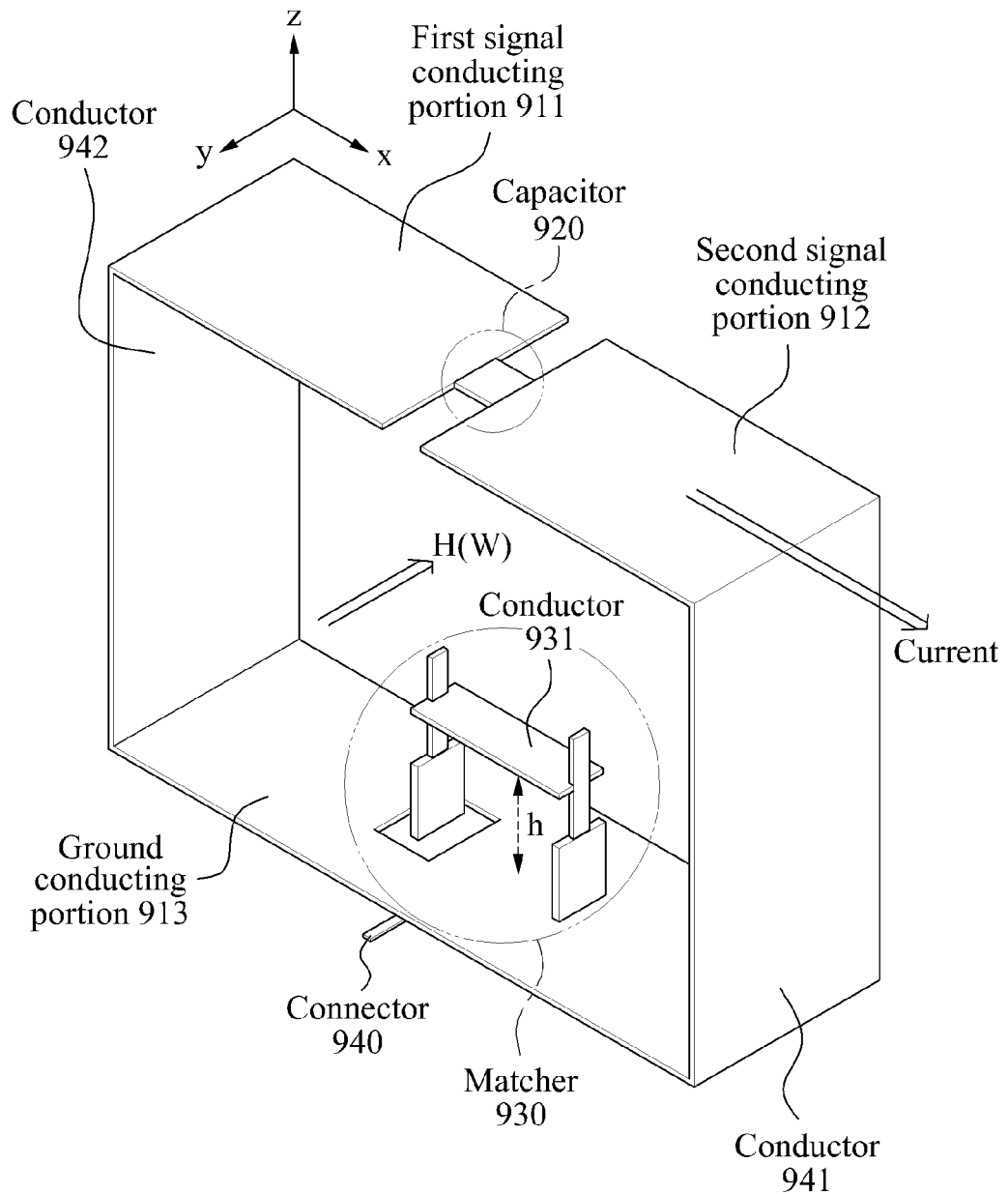

FIG. 9 is an example of a three-dimensional (3D) illustration of a resonator.

Referring to FIG. 9, resonator 900 includes a transmission line and a capacitor 920. The transmission line includes a first signal conducting portion 911, a second signal conducting portion 912, and a ground conducting portion 913. The capacitor 920 is inserted in series between the first signal conducting portion 911 and the second signal conducting portion 912 of the transmission line, and an electric field may be confined within the capacitor 920.

The transmission line includes the first signal conducting portion 911 and the second signal conducting portion 912 in an upper portion of the resonator 900, and includes the ground conducting portion 913 in a lower portion of the resonator 900. In this example, the first signal conducting portion 911 and the second signal conducting portion 912 face the ground conducting portion 913. Current may flow in an x direction through the first signal conducting portion 911 and the second signal conducting portion 912. Due to the current, a magnetic field H(W) may be formed in a −y direction. Alternatively, unlike the diagram of FIG. 9, the magnetic field H(W) may be formed in a +y direction.

One end of the first signal conducting portion 911 is shorted to a conductor 942, and another end of the first signal conducting portion 911 is connected to the capacitor 920. One end of the second signal conducting portion 912 is shorted to the conductor 941, and another end of the second signal conducting portion 912 is connected to the capacitor 920. Accordingly, the first signal conducting portion 911, the second signal conducting portion 912, the ground conducting portion 913, and the conductors 941 and 942 are connected to each other such that the resonator 900 has an electrically closed-loop structure.

As shown in FIG. 9, the capacitor 920 may be inserted into a space between the first signal conducting portion 911 and the second signal conducting portion 912. For example, the capacitor 920 may have a shape of a lumped element, a distributed element, and the like. As an example, a distributed capacitor having the shape of the distributed element may include zigzagged conductor lines and a dielectric material having a relatively high permittivity that is disposed between the zigzagged conductor lines.

As the capacitor 920 is inserted into the transmission line, the resonator 900 may have a property of a metamaterial. If a capacitance of the capacitor inserted as the lumped element is appropriately determined, the resonator 900 may have the characteristic of the metamaterial. Because the resonator 900 may have a negative magnetic permeability in a predetermined frequency band by adjusting the capacitance of the capacitor 920, the resonator 900 may also be referred to as an MNG resonator. Various criteria may be applied to determine the capacitance of the capacitor 920. For example, the various criteria may include a criterion for enabling the resonator 900 to have the characteristic of the metamaterial, a criterion for enabling the resonator 900 to have a negative magnetic permeability in a target frequency, a criterion for enabling the resonator 900 to have a zeroth order resonance characteristic in the target frequency, and the like. Based on at least one criterion from among the aforementioned criteria, the capacitance of the capacitor 920 may be determined.

The resonator 900, also referred to as the MNG resonator 900, may have a zeroth order resonance characteristic of having, as a resonance frequency, a frequency in which a propagation constant is "0". Because the resonator 900 may have the zeroth order resonance characteristic, the resonance frequency may be independent with respect to a physical size of the MNG resonator 900. By appropriately designing the capacitor 920, the MNG resonator 900 may sufficiently change the resonance frequency. Accordingly, the physical size of the MNG resonator 900 may not be changed.

Referring to the MNG resonator 900 of FIG. 9, in a near field, the electric field may be concentrated on the capacitor 920 inserted into the transmission line. Accordingly, due to the capacitor 920, the magnetic field may become dominant in the near field. For example, because the MNG resonator 900 having the zeroth order resonance characteristic may have characteristics similar to a magnetic dipole, the magnetic field may become dominant in the near field. A relatively small amount of the electric field formed due to the insertion of the capacitor 920 may be concentrated on the capacitor 920, and thus, the magnetic field may become further dominant. The MNG resonator 900 may have a relatively high Q-factor using the capacitor 920 of the lumped element, and thus, it is possible to enhance an efficiency of power transmission.

The matcher 930 may be used to adjust the strength of magnetic field of the MNG resonator 900. An impedance of the MNG resonator 900 may be determined by the matcher 930. Current may flow in the MNG resonator 900 via a connector 940, or may flow out from the MNG resonator 900 via the connector 940. As an example, the connector 940 may be connected to the ground conducting portion 913 or the matcher 930.

For example, as shown in FIG. 9, the matcher 930 may be positioned within the loop formed by the loop structure of the resonator 900. The matcher 930 may adjust the impedance of the resonator 900 by changing the physical shape of the matcher 930. For example, the matcher 930 includes the conductor 931 for the impedance-matching in a location that is separated from the ground conducting portion 913 by a distance h. The impedance of the resonator 900 may be changed by adjusting the distance h.

Although not illustrated in FIG. 9, a controller may be provided to control the matcher 930. In this example, the matcher 930 may change the physical shape of the matcher 930 based on a control signal generated by the controller. For example, the distance h between the conductor 931 of the matcher 930 and the ground conducting portion 913 may increase or decrease based on the control signal. Accordingly, the physical shape of the matcher 930 may be changed and the impedance of the resonator 900 may be adjusted. The distance h between the conductor 931 of the matcher 930 and the ground conducting portion 913 may be adjusted using a variety of schemes. As one example, a plurality of conductors may be included in the matcher 930 and the distance h may be adjusted by adaptively activating one of the conductors. As another example, the distance h may be adjusted by adjusting the physical location of the conductor 931 up and down. The distance h may be controlled based on the control signal of the controller. The controller may generate the control signal using various factors. An example of the controller generating the control signal is described later.

As shown in FIG. 9, the matcher 930 may be a passive element such as the conductor 931. For example, the matcher 930 may be an active element such as a diode, a transistor, and the like. If the active element is included in the matcher 930, the active element may be driven based on the control signal generated by the controller, and the impedance of the resonator 900 may be adjusted based on the control signal. For example, if a diode is included in the matcher 930, the impedance of the resonator 900 may be adjusted based on whether the diode is in an on state or in an off state.

Although not illustrated in FIG. 9, a magnetic core may pass through the resonator 900 configured as the MNG resonator. The magnetic core may increase a power transmission distance.

Figure 10:
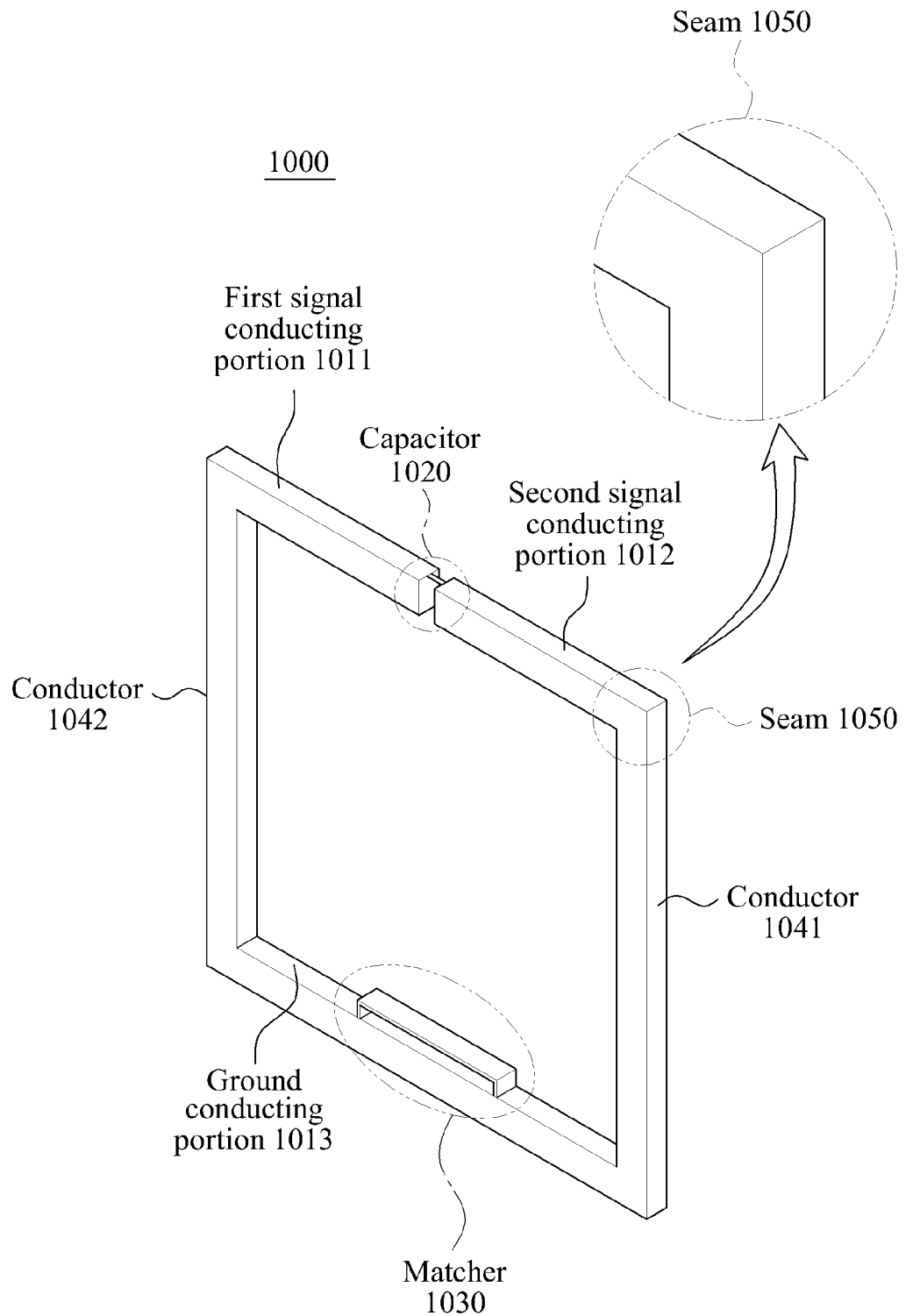

FIG. 10 illustrates an example of a resonator for a wireless power transmission configured as a bulky type.

Referring to FIG. 10, a first signal conducting portion 1011 and a conductor 1042 may be integrally formed of one piece instead of being separately manufactured and subsequently connected to each other. Similarly, the second signal conducting portion 1012 and a conductor 1041 may be integrally manufactured.

If the second signal conducting portion 1012 and the conductor 1041 are separately manufactured and then are connected to each other, a loss of conduction may occur due to a seam 1050. Accordingly, the second signal conducting portion 1012 and the conductor 1041 may be connected to each other without using a separate seam, that is, they may be seamlessly connected to each other. Accordingly, it is possible to decrease a conductor loss that is caused by the seam 1050. As another example, the second signal conducting portion 1012 and a ground conducting portion 1013 may be seamlessly and integrally manufactured. As another example, the first signal conducting portion 1011 and the ground conducting portion 1013 may be seamlessly and integrally manufactured. As another example, the first signal conducting portion 1011 and the conductor 1042 may be seamlessly manufactured. As another example, the conductor 1042 and the ground conducting portion 1013 may be seamlessly manufactured.

Referring to FIG. 10, a type of a seamless connection connecting at least two partitions into an integrated form is referred to as a bulky type.

Figure 11:
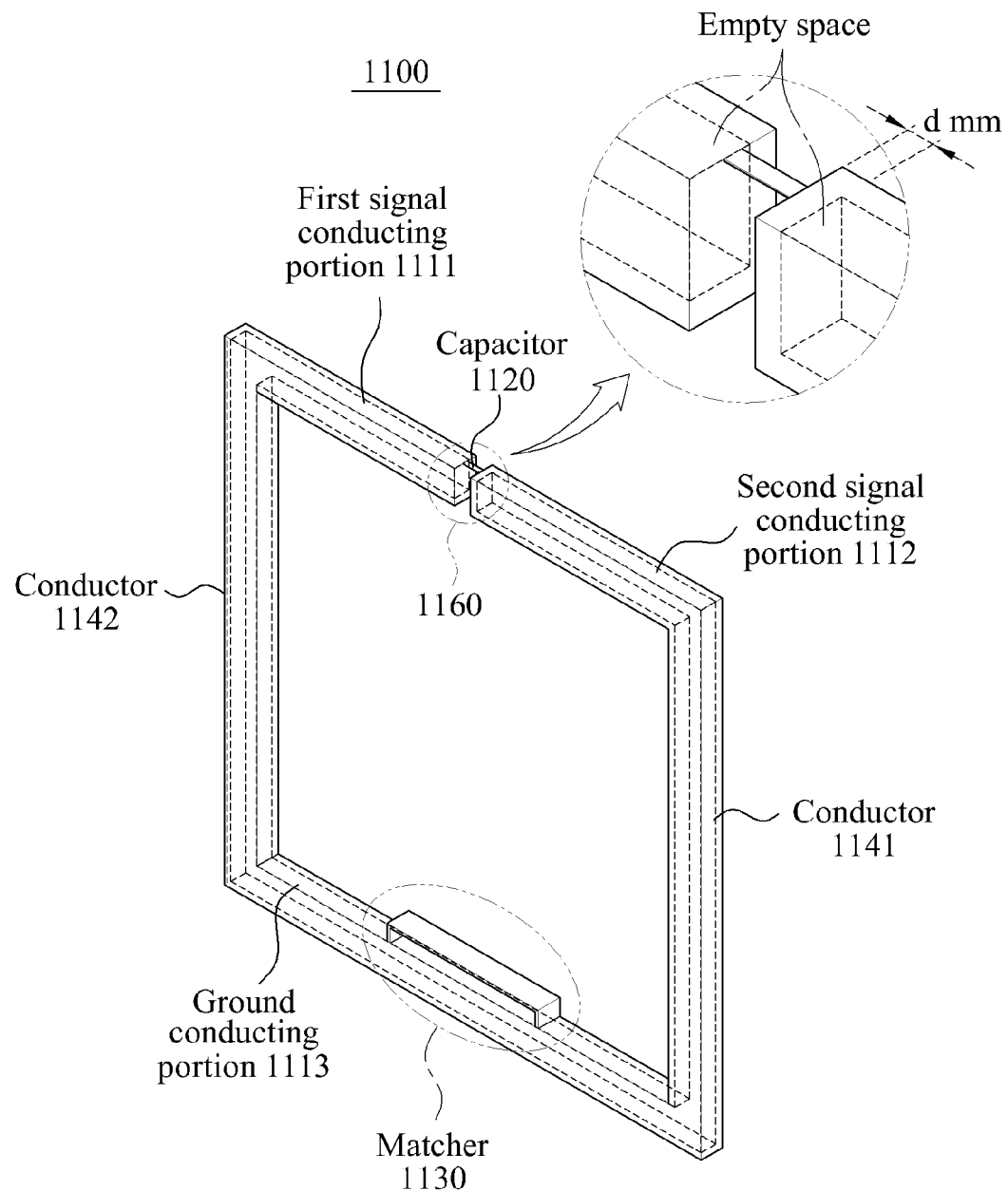

FIG. 11 illustrates an example of a resonator for a wireless power transmission, configured as a hollow type.

Referring to FIG. 11, one or more of a first signal conducting portion 1111, a second signal conducting portion 1112, a ground conducting portion 1113, and conductors 1141 and 1142 of the resonator 1100 configured as the hollow type may include an empty or hollow space inside.

In a given resonance frequency, an active current may be modeled to flow in only a portion of the first signal conducting portion 1111 instead of the entire first signal conducting portion 1111, only a portion of the second signal conducting portion 1112 instead of the entire second signal conducting portion 1112, only a portion of the ground conducting portion 1113 instead of the entire ground conducting portion 1113, and only a portion of the conductors 1141 and 1142 instead of the entire conductors 1141 and 1142. For example, if a depth of each of the first signal conducting portion 1111, the second signal conducting portion 1112, the ground conducting portion 1113, and the conductors 1141 and 1142 are significantly deeper than a corresponding skin depth in the given resonance frequency, it may be ineffective. The significantly deeper depth may increase a weight or manufacturing costs of the resonator 1100.

Accordingly, in the given resonance frequency, the depth of each of the first signal conducting portion 1111, the second signal conducting portion 1112, the ground conducting portion 1113, and the conductors 1141 and 1142 may be determined based on the corresponding skin depth of each of the first signal conducting portion 1111, the second signal conducting portion 1112, the ground conducting portion 1113, and the conductors 1141 and 1142. If each of the first signal conducting portion 1111, the second signal conducting portion 1112, the ground conducting portion 1113, and the conductors 1141 and 1142 has an appropriate depth deeper than a corresponding skin depth, the resonator 1100 may become light, and manufacturing costs of the resonator 1100 may also decrease.

For example, as shown in FIG. 11, the depth of the second signal conducting portion 1112 may be determined as "d" mm. In this example, d may be determined according to $$d = \frac{1}{\sqrt{\pi f \mu \sigma}}.$$

Here, f denotes a frequency, μ denotes a magnetic permeability, and σ denotes a conductor constant. As an example, if the first signal conducting portion 1111, the second signal conducting portion 1112, the ground conducting portion 1113, and the conductors 1141 and 1142 are made of a copper and have a conductivity of $5.8 \times 10^7$ Siemens per meter (S·m$^{-1}$), the skin depth may be about 0.6 mm with respect to 10 kHz of the resonance frequency and the skin depth may be about 0.006 mm with respect to 100 MHz of the resonance frequency.

Figure 12:
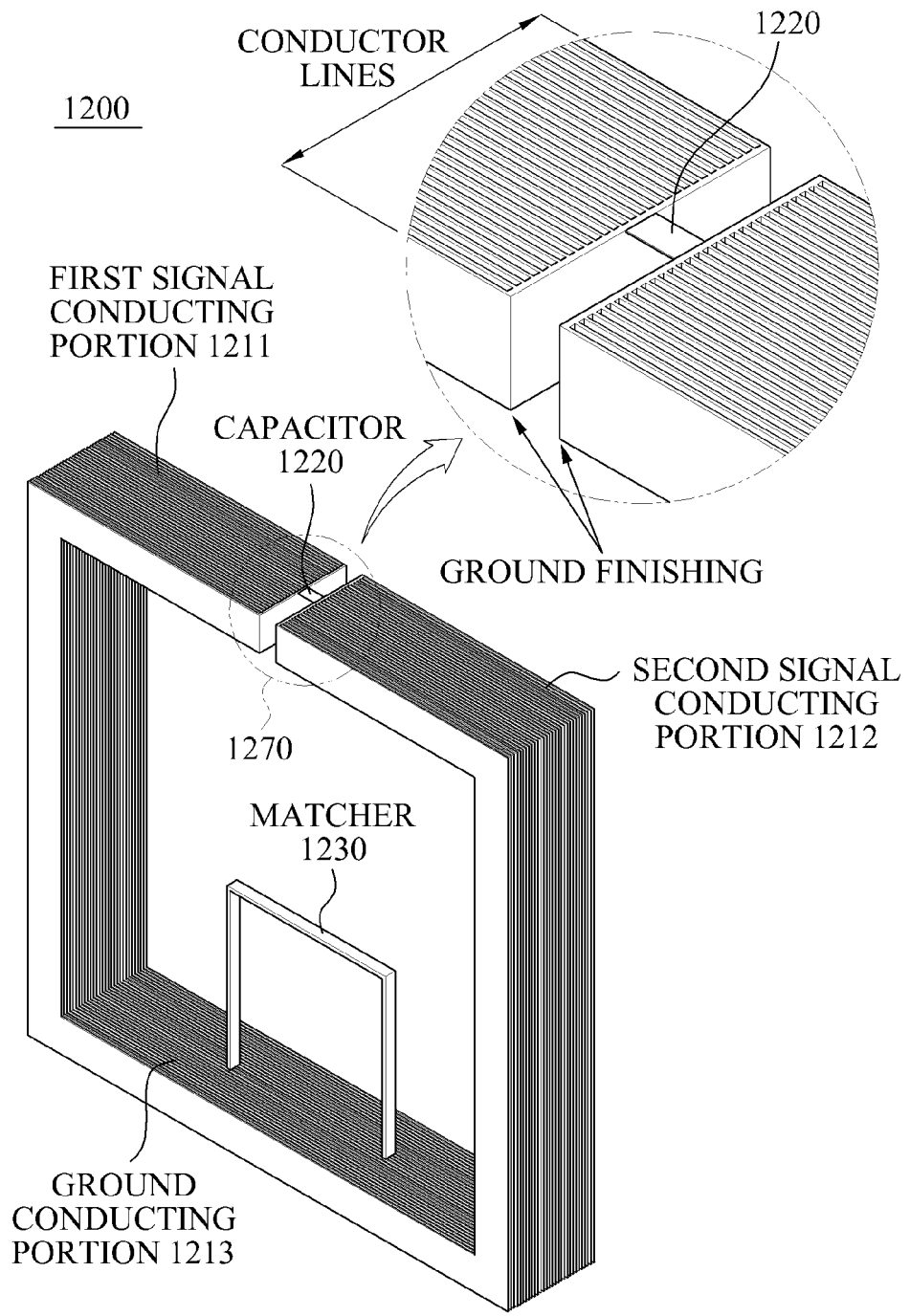

FIG. 12 illustrates an example of a resonator for a wireless power transmission using a parallel-sheet.

Referring to FIG. 12, the parallel-sheet may be applicable to each of a first signal conducting portion 1211 and a second signal conducting portion 1212 included in the resonator 1200.

Each of the first signal conducting portion 1211 and the second signal conducting portion 1212 may not be a perfect conductor, and thus, may have some resistance. Due to the resistance, an ohmic loss may occur. The ohmic loss may decrease a Q-factor and also decrease a coupling effect.

By applying the parallel-sheet to each of the first signal conducting portion 1211 and the second signal conducting portion 1212, it is possible to decrease the ohmic loss, and to increase the Q-factor and the coupling effect. Referring to a portion 1270 indicated by a circle, the parallel-sheet is applied, and each of the first signal conducting portion 1211 and the second signal conducting portion 1212 includes a plurality of conductor lines. The plurality of conductor lines are disposed in parallel, and are shorted at an end portion of each of the first signal conducting portion 1211 and the second signal conducting portion 1212.

By applying the parallel-sheet example to each of the first signal conducting portion 1211 and the second signal conducting portion 1212, the plurality of conductor lines may be disposed in parallel. Accordingly, a sum of resistances having the conductor lines may decrease. Consequently, the resistance loss may decrease, and the Q-factor and the coupling effect may increase.

Figure 13:
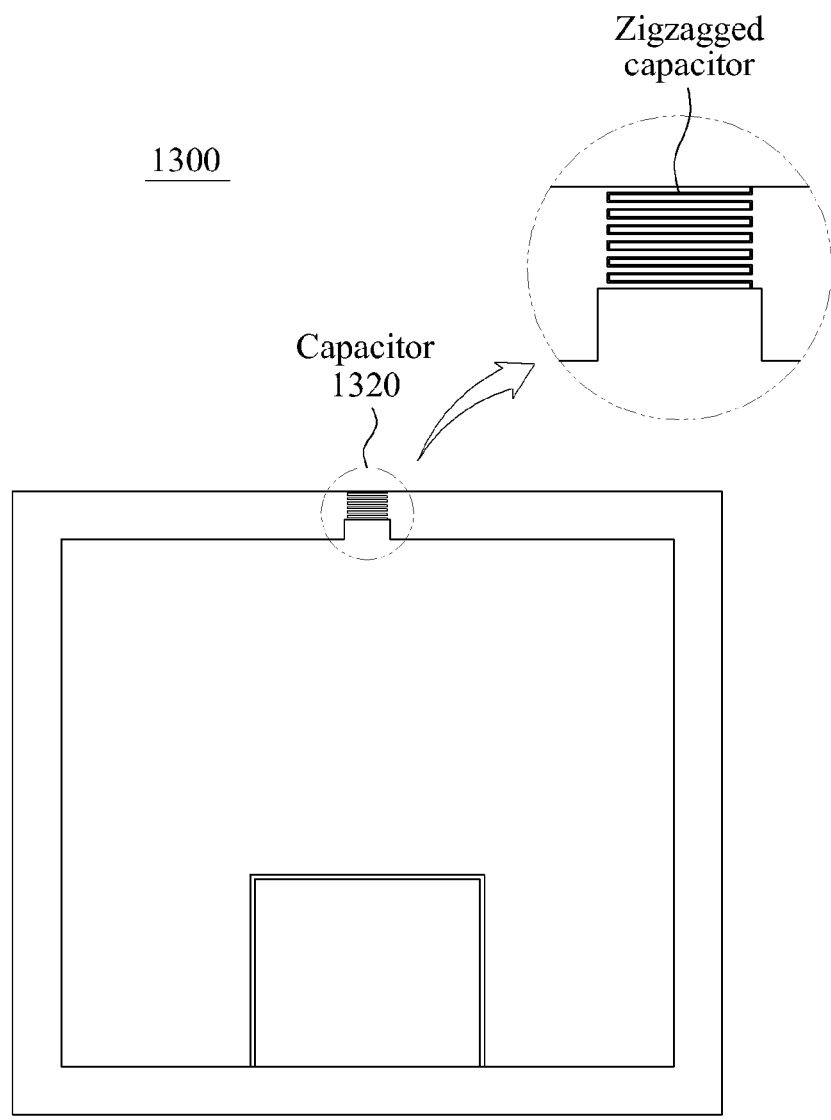

FIG. 13 illustrates an example of a resonator for a wireless power transmission, including a distributed capacitor.

Referring to FIG. 13, a capacitor 1320 included in resonator 1300 for the wireless power transmission may be a distributed capacitor. A capacitor as a lumped element may have a relatively high equivalent series resistance (ESR). A variety of schemes have been proposed to decrease the ESR contained in the capacitor of the lumped element. For example, by using the capacitor 1320 as a distributed element, it is possible to decrease the ESR. Loss caused by the ESR may decrease a Q-factor and a coupling effect.

As shown in FIG. 13, the capacitor 1320 as the distributed element may have a zigzagged structure. For example, the capacitor 1320 as the distributed element may be configured as a conductive line and a conductor having the zigzagged structure.

By including the capacitor 1320 as the distributed element, it is possible to decrease the loss occurring due to the ESR. In addition, by disposing a plurality of capacitors as lumped elements, it is possible to decrease the loss occurring due to the ESR. Because a resistance of each of the capacitors as the lumped elements decreases through a parallel connection, active resistances of parallel-connected capacitors as the lumped elements may also decrease and the loss occurring due to the ESR may decrease. For example, by including ten capacitors of 1 pF instead of using a single capacitor of 10 pF, it is possible to decrease the loss occurring due to the ESR.

Figure 14A:
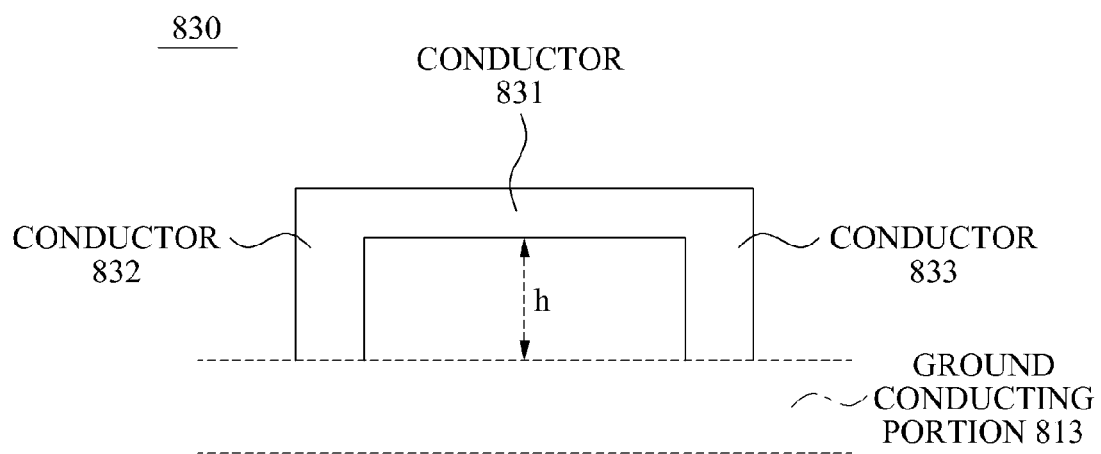
Figure 14B:
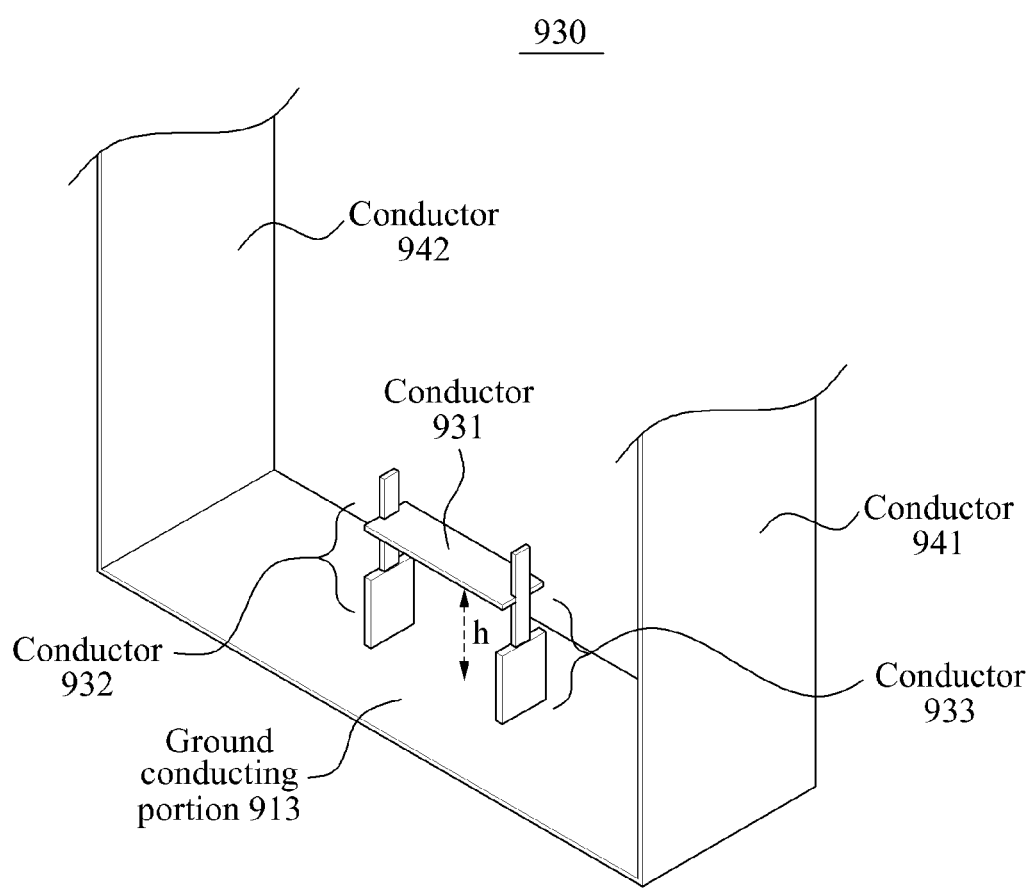

FIG. 14A illustrates an example of the matcher 830 used in the resonator 800 provided in FIG. 8, and FIG. 14B illustrates an example of the matcher 930 used in the resonator 900 provided in FIG. 9.

Specifically, FIG. 14A illustrates a portion of the resonator 800 including the matcher 830, and FIG. 14B illustrates a portion of the resonator 900 including the matcher 930.

Referring to FIG. 14A, the matcher 830 includes a conductor 831, a conductor 832, and a conductor 833. The conductors 832 and 833 are connected to the ground conducting portion 813 and the conductor 831. The impedance of the resonator may be determined based on a distance h between the conductor 831 and the ground conducting portion 813. The distance h between the conductor 831 and the ground conducting portion 813 may be controlled by the controller. The distance h between the conductor 831 and the ground conducting portion 813 may be adjusted using a variety of schemes. For example, the variety of schemes may include a scheme of adjusting the distance h by adaptively activating one of the conductors 831, 832, and 833, a scheme of adjusting the physical location of the conductor 831 up and down, and the like.

Referring to FIG. 14B, the matcher 930 includes a conductor 931, a conductor 932, and a conductor 933. The conductors 932 and 933 are connected to the ground conducting portion 913 and the conductor 931. The impedance of the resonator may be determined based on a distance h between the conductor 931 and the ground conducting portion 913. The distance h between the conductor 931 and the ground conducting portion 913 may be controlled by the controller. Similar to the matcher 830 included in the resonator 800, the distance h between the conductor 931 and the ground conducting portion 913 may be adjusted using a variety of schemes. For example, the variety of schemes may include a scheme of adjusting the distance h by adaptively activating one of the conductors 931, 932, and 933, a scheme of adjusting the physical location of the conductor 931 up and down, and the like.

Although not illustrated in FIGS. 14A and 14B, the matcher may include an active element. For example, the impedance of the resonator may be adjusted by changing a path of a current flowing through the matcher using the active element.

Figure 15:
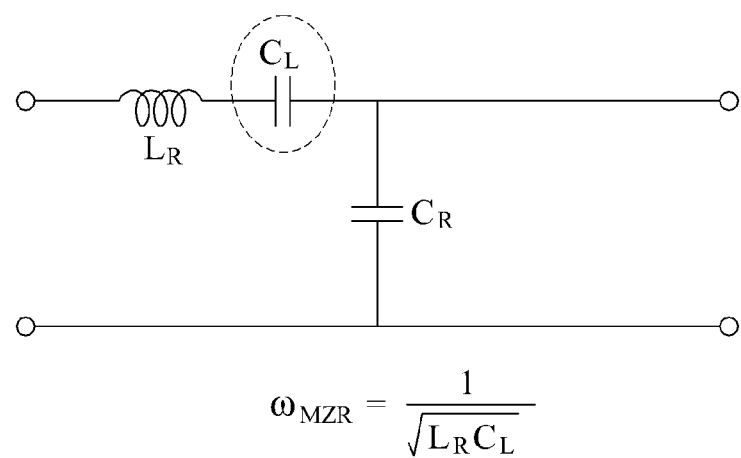
FIG. 15 is a diagram illustrating an example of an equivalent circuit of the resonator illustrated in FIG. 8.

FIG. 15 illustrates an example of an equivalent circuit of the resonator 800 for the wireless power transmission of FIG. 8.

The resonator 800 for the wireless power transmission may be modeled to the equivalent circuit of FIG. 15. In the equivalent circuit of FIG. 15, $C_L$ denotes a capacitor that is inserted in the form of a lumped element in the middle of the transmission line of FIG. 8.

For example, the resonator 800 may have a zeroth resonance characteristic. If a propagation constant is "0", the resonator 800 may be assumed to have $\omega_{MZR}$ as a resonance frequency. The resonance frequency $\omega_{MZR}$ may be expressed by Equation 4.

$$\omega_{MZR} = \frac{1}{\sqrt{L_R C_L}} \qquad \text{[Equation 4]}$$

In Equation 4, MZR denotes a Mu zero resonator.

Referring to Equation 4, the resonance frequency $\omega_{MZR}$ of the resonator 800 may be determined by $L_R/C_L$. A physical size of the resonator 800 and the resonance frequency $\omega_{MZR}$ may be independent with respect to each other. Because the physical sizes are independent with respect to each other, the physical size of the resonator 800 may be sufficiently reduced.

Figure 16:
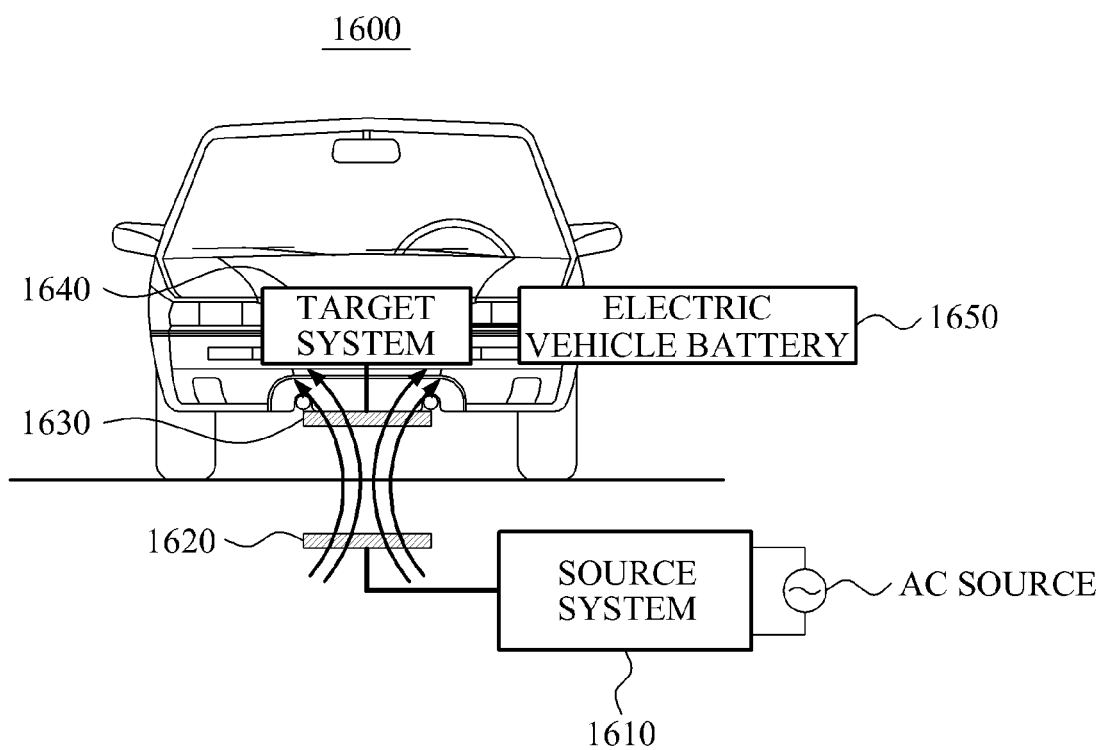
FIG. 16 is a diagram illustrating an electric vehicle charging system.

FIG. 16 illustrates an electric vehicle charging system.

Referring to FIG. 16, an electric vehicle charging system 1600 includes a source system 1610, a source resonator 1620, a target resonator 1630, a target system 1640, and an electric vehicle battery 1650.

The electric vehicle charging system 1600 may have a similar structure to the wireless power transmission system of FIG. 1. The source system 1610 and the source resonator 1620 in the electric vehicle charging system 1600 may function as a source. Additionally, the target resonator 1630 and the target system 1640 in the electric vehicle charging system 1600 may function as a target.

The source system 1610 may include a variable SMPS, a power amplifier, a matching network, a controller, and a communication unit, similarly to the source 110 of FIG. 1. The target system 1640 may include a matching network, a rectification unit, a DC/DC converter, a communication unit, and a controller, similarly to the target 120 of FIG. 1.

The electric vehicle battery 1650 may be charged by the target system 1640.

The electric vehicle charging system 1600 may use a resonant frequency in a band of a few kilohertz (KHz) to tens of MHz.

The source system 1610 may generate power, based on a type of charging vehicle, a capacity of a battery, and a charging state of a battery, and may supply the generated power to the target system 1640.

The source system 1610 may control the source resonator 1620 and the target resonator 1630 to be aligned. For example, when the source resonator 1620 and the target resonator 1630 are not aligned, the controller of the source system 1610 may transmit a message to the target system 1640, and may control alignment between the source resonator 1620 and the target resonator 1630.

For example, when the target resonator 1630 is not located in a position enabling maximum magnetic resonance, the source resonator 1620 and the target resonator 1630 may not be aligned. When a vehicle does not stop accurately, the source system 1610 may induce a position of the vehicle to be adjusted, and may control the source resonator 1620 and the target resonator 1630 to be aligned.

The source system 1610 and the target system 1640 may transmit or receive an ID of a vehicle, or may exchange various messages, through communication.

The descriptions of FIGS. 2 through 15 may be applied to the electric vehicle charging system 1600. However, the electric vehicle charging system 1600 may use a resonant frequency in a band of a few KHz to tens of MHz, and may transmit power that is equal to or higher than tens of watts to charge the electric vehicle battery 1650.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An impedance control method of a wireless power transmitter configured to transmit power to at least one of target device, the method comprising:

generating power for charging by determining an impedance of a source resonator, and adjusting a voltage level of a direct current (DC) voltage to be supplied to a power amplifier;

transmitting the charging power to the at least one of target device through magnetic coupling; and adjusting the impedance of the source resonator based on one or more of a reflected wave of the charging power, an amount of power received by each of the at least one of target device, an amount of the charging power, or a transmission efficiency of the charging power.

2. The method of claim 1, further comprising, prior to generating a charging power:

transmitting a wake-up request message to the at least one of target device;

receiving response messages corresponding to the wake-up request message from the at least one of target device; and detecting the number of the at least one of target device based on the received response messages.

3. The method of claim 2, wherein each of the response messages comprises one or more of a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a used frequency band of the corresponding target device, an amount of a power to be used for the corresponding target device, an intrinsic identifier of the corresponding target device, and product version information or standards information of the corresponding target device.

4. The method of claim 1, wherein the adjusting of the impedance of the source resonator is performed by controlling N matching switches to be powered ON and/or OFF, and the N matching switches are connected to a plurality of capacitors and/or a plurality of inductors.

5. The method of claim 4, wherein the adjusting of the impedance of the source resonator comprises:
   calculating a voltage standing wave ratio (VSWR) based on a voltage level of the reflected wave, a level of an output voltage, and a level of an output current of a source resonator;
   controlling the N matching switches to be powered ON and OFF, in response to the VSWR being less than a predetermined reference value;
   determining a tracking impedance having a power transmission efficiency above a predetermined threshold; and
   changing the impedance of the source resonator to the tracking impedance having the power transmission efficiency above the predetermined threshold.

6. The method of claim 5, wherein the determining of the tracking impedance having the power transmission efficiency above a predetermined threshold comprises performing the following operations a) through g) continuously for each of the N matching switches,
   a) selecting at least one of the N matching switches based on a predetermined selection scheme;
   b) changing the impedance of the source resonator to a selected impedance, by controlling the at least one selected matching switch to be powered ON;
   c) transmitting the charging power;
   d) transmitting, to the at least one of target device, a command to request an input voltage value and an input current value of a target device, or a command to request a DC/DC output voltage value and a DC/DC output current value of the target device;
   e) receiving, from each of the at least one of target device, an input voltage value and an input current value of a rectification unit, or the DC/DC output voltage value and the DC/DC output current value;
   f) calculating an amount of a power received by each of the at least one of target device, based on the input voltage value and the input current value, or the DC/DC output voltage value and the DC/DC output current value; and
   g) calculating a transmission efficiency of the charging power, based on an output voltage level and an output current level of the source resonator, and the amount of a power received by each of the at least one of target device.

7. The method of claim 6, wherein the predetermined selection scheme in the operation a) corresponds to a scheme of selecting matching switches so that the plurality of capacitors may be powered ON and OFF in a sequential order, beginning from a capacitor having a lowest capacitance value to a capacitor having a highest capacitance value, or a scheme of selecting matching switches so that the plurality of capacitors may be powered ON and OFF in a sequential order, beginning from the capacitor having the highest capacitance value to the capacitor having the lowest capacitance value.

8. The method of claim 7, wherein the predetermined selection scheme in the operation a) corresponds to a scheme of classifying the N matching switches into M groups, selecting one of the M groups based on the number of the one or more target devices, and sequentially selecting tracking frequencies included in the selected group, M being less than N.

9. The method of claim 6, wherein the predetermined selection scheme in the operation a) corresponds to a scheme of sequentially selecting M matching switches from the N matching switches, performing the operations b) through g) continuously for each of the M matching switches, and subsequently performing the operations b) through g) continuously for each matching switch, excluding the M matching switches from the N matching switches, M being less than N.

10. The method of claim 1, wherein the generating of the charging power comprises determining the voltage level of the DC voltage to be supplied to the power amplifier based on one or more of a product type of the corresponding target device, a manufacturer information of the corresponding target device, a product model name of the corresponding target device, a battery type of the corresponding target device, a charging scheme of the corresponding target device, an impedance value of the load of the corresponding target device, information about the characteristic of the target resonator of the corresponding target device, information about the used frequency band of the corresponding target device, and an amount of a power to be used for the corresponding target device.

11. The method of claim 1, wherein the generating of the charging power comprises:
   generating power for charging by determining the impedance of a source resonator based on the number of the at least one of target device, and adjusting the voltage level of the direct current (DC) voltage to be supplied to the power amplifier based on the number of the at least one of target device.

12. A wireless power transmitter comprising:
   a power converter configured to generate a charging power used for charging in at least one of target device, by converting a direct current (DC) voltage to be supplied to a power amplifier to an alternating current (AC) voltage using a resonance frequency;
   a source resonator configured to transmit, to at least one of target device, the generated power through magnetic coupling; and
   an impedance adjusting unit configured to adjust an impedance of the source resonator based on one or more of a reflected wave of the charging power, an amount of power received by each of the at least one of target device, an amount of the charging power, or a transmission efficiency of the charging power.

13. The wireless power transmitter of claim 12, wherein the impedance adjustment unit is configured to adjust the impedance of the source resonator by controlling N matching switches to be powered ON and OFF, and the impedance adjusting unit comprises the N matching switches which are connected to a plurality of capacitors and/or a plurality of inductors.

14. The wireless power transmitter of claim 12, further comprising a control and communication unit configured to determine the impedance of the source resonator, and a voltage level of the DC voltage to be supplied to the power amplifier based on the number of the at least one of target device, and to control the impedance adjusting unit.

15. The wireless power transmitter of claim 14, wherein the control and communication unit is configured to determine the voltage level of the DC voltage to be supplied to the power amplifier, based on one or more of a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a used frequency band of the corresponding target device, and an amount of a power to be used for the corresponding target device.

16. The wireless power transmitter of claim 14, wherein the control and communication unit is configured to calculate a voltage standing wave ratio (VSWR) based on a voltage level of the reflected wave, a level of an output voltage, and a level of an output current of the source resonator, to control the N matching switches to be powered ON and OFF if the VSWR is less than a predetermined value, to determine a tracking impedance having a power transmission efficiency above a predetermined threshold, and to change the impedance of the source resonator to the tracking impedance having the power transmission efficiency above the predetermined threshold.

17. The wireless power transmitter of claim 16, wherein the control and communication unit is configured to perform the following operations a) through g) continuously for each of the N matching switches in order to determine the tracking impedance having the power transmission efficiency above the predetermined threshold,
 a) selecting at least one of the N matching switches, based on a predetermined selection scheme;
 b) changing the impedance of the source resonator to a selected impedance, by controlling the at least one selected matching switch to be powered ON;
 c) transmitting the charging power;
 d) transmitting, to the at least one of target device, a command to request an input voltage value and an input current value of a target device, or a command to request a DC/DC output voltage value and a DC/DC output current value of the target device;
 e) receiving, from each of the at least one of target device, an input voltage value and an input current value of a rectification unit, or the DC/DC output voltage value and the DC/DC output current value;
 f) calculating an amount of a power received by each of the at least one of target device, based on the input voltage value and the input current value, or the DC/DC output voltage value and the DC/DC output current value; and
 g) calculating a transmission efficiency of the charging power, based on an output voltage level and an output current level of the source resonator, and the amount of a power received by each of the at least one of tar et device.

18. The wireless power transmitter of claim 17, wherein the predetermined selection scheme in the operation a) corresponds to a scheme of selecting matching switches so that the plurality of capacitors may be powered ON and OFF in a sequential order, beginning from a capacitor having a lowest capacitance value to a capacitor having a highest capacitance value, or a scheme of selecting matching switches so that the plurality of capacitors may be powered ON and OFF in a sequential order, beginning from the capacitor having the highest capacitance value to the capacitor having the lowest capacitance value.

19. The wireless power transmitter of claim 17, wherein the predetermined selection scheme in the operation a) corresponds to a scheme of sequentially selecting M matching switches from the N matching switches, performing the operations b) through g) continuously for each of the M matching switches, and subsequently performing the operations b) through g) continuously for each matching switch, excluding the M matching switches from the N matching switches, M being less than N.

20. The wireless power transmitter of claim 17, wherein the predetermined selection scheme in the operation a) corresponds to a scheme of classifying the N matching switches into M groups, selecting one of the M groups based on the number of the at least one of target device, and sequentially selecting matching switches included in the selected group, M being less than N.

21. A wireless power receiver comprising:
 a target resonator configured to receive power from a source resonator through magnetic coupling with the source resonator; and
 a control and communication unit configured to detect an amount of power received by the target resonator, and to transmit, to a wireless power transmitter, information about the amount of the power received by the target resonator,
 wherein an impedance of the source resonator is adjusted based on at least one of a reflected wave of the charging power, an amount of a power received by the target resonator, an amount of the charging power, or a transmission efficiency of the charging power.

22. The wireless power receiver of claim 21, further comprising:
 a rectification unit configured to generate a direct current (DC) voltage by rectifying an alternating current (AC) voltage of the power received by the target resonator; and
 a DC/DC converter configured to supply a voltage of a predetermined level to a load by adjusting a level of the DC voltage.

23. The wireless power receiver of claim 22, wherein the information about the amount of power received by the target resonator corresponds to an input voltage value and an input current value of the rectification unit, an output voltage value and an output current value of the rectification unit, or a DC/DC output voltage value and a DC/DC output current value.

24. A power receiving method of a wireless power receiver, the method comprising:
 receiving power from a wireless power transmitter through magnetic coupling;
 receiving a first power used for charging from the wireless power transmitter; and
 receiving a second power used for charging, that is generated after an impedance of the source resonator is adjusted in the wireless power transmitter,
 wherein the impedance of the source resonator is adjusted based on one or more of at reflected wave of the first power used for charging, an amount of the first power used for charging, or a transmission efficiency of the first power used for charging.

25. The power receiving method claim 24, further comprising:
 receiving a wake-up request message from the wireless power transmitter; and
 transmitting, to the wireless power transmitter, a response message corresponding to the wake-up request message.

26. The method of claim 25, wherein the response message corresponding to the wake-up request message comprises one or more of a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a used frequency band of the corresponding target device, an amount of a power to be used for the corresponding target device, an intrinsic identifier of the corresponding target device, and product version information or standards information of the corresponding target device.

27. The method of claim 24, wherein the first power used for charging is generated by adjusting a voltage level of a direct current (DC) voltage to be supplied to a power amplifier of the wireless power transmitter.

28. The method of claim 24, wherein the adjusted impedance of the source resonator corresponds to a tracking impedance having a power transmission efficiency above a predetermined threshold.

29. The method of claim 28, wherein the tracking impedance having the power transmission efficiency above the predetermined threshold is determined by performing the following operations a) through c) continuously for each of the plurality of predetermined tracking impedances,
   a) receiving the second power used for charging;
   b) receiving, from the wireless power transmitter, a command to request an input voltage value and an input current value of a target device, or a command to request a DC/DC output voltage value and a DC/DC output current value of the target device; and
   c) transmitting, to the wireless power transmitter, an input voltage value and an input current value of a rectification unit, or the DC/DC output voltage value and the DC/DC output current value.

* * * * *